(12) United States Patent
Becker et al.

(10) Patent No.: US 12,444,135 B1
(45) Date of Patent: Oct. 14, 2025

(54) CONTAINER FILE VIEWING

(71) Applicant: Apple Inc., Cupertino, CA (US)

(72) Inventors: Zachary Z. Becker, Issaquah, WA (US); Adam M. O'Hern, Campbell, CA (US); Philip M. Simmons, San Rafael, CA (US); Scott Bassett, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 237 days.

(21) Appl. No.: 18/205,386

(22) Filed: Jun. 2, 2023

Related U.S. Application Data

(60) Provisional application No. 63/348,584, filed on Jun. 3, 2022.

(51) Int. Cl.
| | | |
|---|---|---|
| *G06T 17/20* | (2006.01) | |
| *G02B 27/01* | (2006.01) | |
| *G06F 3/04815* | (2022.01) | |
| *G06F 3/0482* | (2013.01) | |

(52) U.S. Cl.
CPC .......... *G06T 17/20* (2013.01); *G02B 27/0172* (2013.01); *G06F 3/04815* (2013.01); *G06F 3/0482* (2013.01)

(58) Field of Classification Search
CPC . G06T 17/20; G02B 27/0172; G06F 3/04815; G06F 3/0482
See application file for complete search history.

(56) References Cited

U.S. PATENT DOCUMENTS

| | | | | |
|---|---|---|---|---|
| 2012/0249544 | A1* | 10/2012 | Maciocci | H04N 9/3173 345/419 |
| 2012/0249550 | A1* | 10/2012 | Akeley | H04N 21/6582 345/419 |
| 2021/0042022 | A1* | 2/2021 | Richter | A63F 13/79 |

* cited by examiner

*Primary Examiner* — Michelle Chin
(74) *Attorney, Agent, or Firm* — Fernando & Partners, LLP

(57) ABSTRACT

In one implementation, a method of casting a scene is performed at a first device including a display, an input device, one or more processors, and non-transitory memory. The method includes displaying, on the display, a graphical user interface for composing an XR scene, wherein the graphical user interface includes an assets region displaying a list of assets of the XR scene and a casting affordance. The method includes detecting, via the input device, a user input selecting the casting affordance. The method includes, in response to detecting the user input selecting the casting affordance, determining a second device to receive a container file, wherein the second device is a stereoscopic device. The method includes storing the assets of the XR scene as the container file. The method includes transmitting the container file to the second device.

20 Claims, 30 Drawing Sheets

320

At a device including a display, an input device, one or more processors, and non-transitory memory:

Displaying, on the display, a graphical user interface for composing an XR scene, wherein the graphical user interface includes an assets region displaying a list of assets of the XR scene and a casting affordance — 321

Detecting, via the input device, a user input selecting the casting affordance — 322

In response to detecting the user input selecting the casting affordance, determining a second device to receive a container file — 323

Storing the assets of the XR scene as the container file — 324

Transmitting the container file to the second device — 325

Figure 3B

CONTAINER FILE VIEWING

CROSS-REFERENCE TO RELATED APPLICATIONS

This application claims priority to U.S. Provisional Patent App. No. 63/348,584, filed on Jun. 3, 2022, which is hereby incorporated by reference in its entirety.

TECHNICAL FIELD

The present disclosure generally relates to user interfaces for viewing container files.

BACKGROUND

In various implementations, container files contain a number of constituent files in a hierarchy. Navigating this hierarchy to view such constituent files can be cumbersome and time-consuming.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3B is a flowchart representation of a method of casting a scene in accordance with some implementations.

Figure 1:
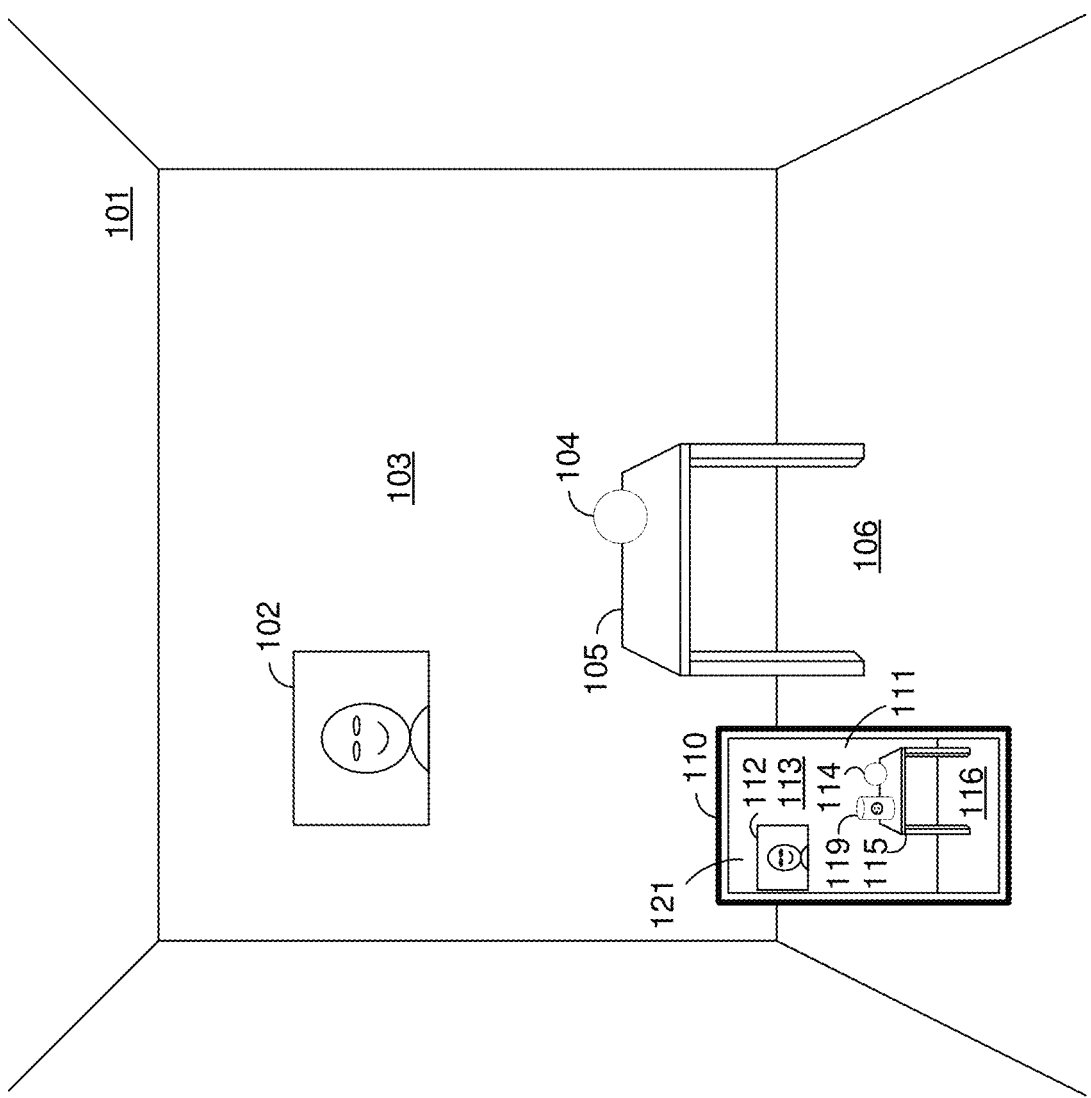
FIG. 1 illustrates a physical setting with an electronic device surveying the physical setting.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for displaying files. In various implementations, the method is performed at a device including a display, an input device, one or more processors, and non-transitory memory. The method includes displaying, in a first area of the display, a plurality of file representations respectively representing a plurality of files. The method includes detecting, via the input device, selection of a first file representation representing a first file from the plurality of file representations, wherein the first file is a first container file including a plurality of first constituent files. The method includes determining a first file type. The method includes while displaying the plurality of file representations, displaying, in a second area of the display, a first set of first constituent file representations respectively representing each of the plurality of first constituent files having the first file type.

Various implementations disclosed herein include devices, systems, and method for casting a scene. In various implementations, the method is performed at a first device including a display, an input device, one or more processors, and non-transitory memory. The method includes displaying, on the display, a graphical user interface for composing an XR scene, wherein the graphical user interface includes an assets region displaying a list of assets of the XR scene and a casting affordance. The method includes detecting, via the input device, a user input selecting the casting affordance. The method includes, in response to detecting the user input selecting the casting affordance, determining a second device to receive a container file, wherein the second device is a stereoscopic device. The method includes storing the assets of the XR scene as the container file. The method includes transmitting the container file to the second device.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

FIG. 1 illustrates a physical environment 101 with an electronic device 110 surveying the physical environment 101. The physical environment 101 includes a picture 102 hanging on a wall 103, a table 105 on a floor 106, and a ball 104 on the table 105.

The electronic device 110 displays, on a display, an image of an XR environment 121 which includes a representation of the physical environment 111 and a representation of a virtual object 119. In various implementations, the representation of the physical environment 111 is generated based on an image of the physical environment 101 captured with one or more cameras of the electronic device 110 having a field-of-view directed toward the physical environment 101. Suitable cameras include scene cameras, event cameras, depth cameras, and so forth. Accordingly, the representation of the physical environment 111 includes a representation of the picture 112 hanging on a representation of the wall 113, a representation of the table 115 on a representation of the floor 116, and a representation of the ball 114 on the representation of the table 115.

In addition to the representations of real objects of the physical setting 101, the image of the XR environment 121 includes a representation of the virtual object 119. The visual appearance of virtual object 119 is defined by software on the electronic device 110. The electronic device 110 presents virtual object 119 as resting on the top surface of the representation of the table 115 by accounting for the position and orientation of device 110 relative to table 105.

Figure 2A:
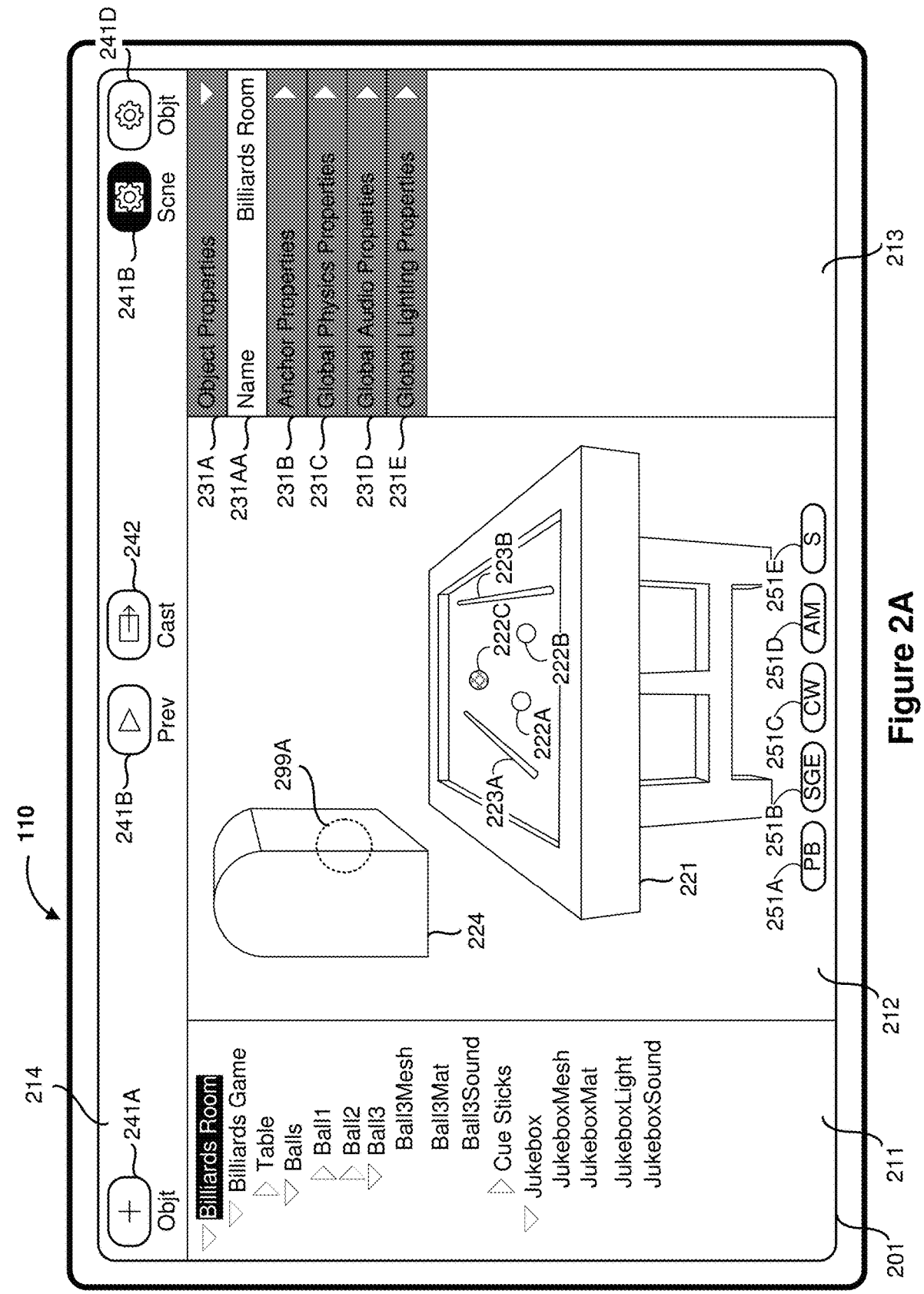
FIGS. 2A-2Y illustrate the electronic device of FIG. 1 displaying a graphical user interface (GUI) for composing a scene.

FIG. 2A illustrates the electronic device 110 displaying a graphical user interface (GUI) 201 for composing an XR scene. In particular, the GUI 201 includes a representation of the XR scene. In various implementations, an application of the electronic device 110 or a different electronic device executes to present the XR scene in an XR environment, such as a virtual environment or in association with a representation of a physical environment.

The GUI 201 includes an assets region 211, a view region 212, a settings region 213, and a toolbar region 214. The assets region 211 includes a list of assets associated with the XR scene in a hierarchical manner. Each asset that includes sub-assets is displayed with an expand/contract affordance (e.g., a triangle in FIG. 2A) which, when selected, causes the asset to expand to show the sub-assets or contract to hide the sub-assets and save screen space. The assets of the XR scene include a virtual billiards game including a virtual table, a set of virtual balls (including a first virtual ball, a second virtual ball, and a third virtual ball), and a set of virtual cue sticks (including a first virtual cue stick and a second virtual cue stick). The assets of the XR scene include a virtual jukebox. The virtual objects (e.g., the third virtual ball) include one or more assets such as a mesh, a material, a sound, a light, or code.

In various implementations, the virtual billiards room is stored as a container file (e.g., a 3D scene container file) including constituent files in a hierarchical format. For example, in various implementations, the virtual billiards room file includes a virtual billiards game file and a virtual jukebox file. The virtual billiards game file includes a virtual table file (which, in turn, includes a table mesh file entitled "TableMesh" and a table material file entitled "TableMat"), a virtual balls file which includes a first virtual ball file, a second virtual ball file, and a third virtual ball file, and a virtual cue sticks file which includes a first virtual cue stick file and a second virtual cue stick file. The first virtual ball file includes a first virtual ball mesh file entitled "Ball1Mesh", a first virtual ball material file entitled "Ball1Mat", and a first virtual ball sound file entitled "Ball1Sound". The second virtual ball file includes a second virtual ball mesh file entitled "Ball2Mesh" and a second virtual ball sound file entitled "Ball2Sound". Notably, in FIG. 2A, the second virtual ball file does not include a second virtual ball material file. However, such a file entitled "Ball2Mat" will be generated by the process illustrated in FIGS. 2A-2T. The third virtual ball file includes a third virtual ball mesh file entitled "Ball3Mesh", a third virtual ball material file entitled "Ball3Mat", and a third virtual ball sound file entitled "Ball3Sound". The first virtual cue stick file includes a first virtual cue stick mesh filed entitled "CueStick1Mesh" and a first virtual cue stick material file entitled "CueStick1Mat". The second virtual cue stick file includes a second virtual cue stick mesh filed entitled "CueStick2Mesh" and a second virtual cue stick material file entitled "CueStick2Mat". The virtual jukebox file includes a virtual jukebox mesh file entitled "JukeboxMesh", a virtual jukebox material file entitled "JukeboxMat", a virtual jukebox sound file entitled "JukeboxSound", and a virtual jukebox lighting file entitled "JukeboxLight".

The view region 212 includes a representation of the XR scene. In various implementations, the XR scene includes a virtual billiards room. Accordingly, in FIG. 2A, the representation of the XR scene in the view region 212 includes a representation of the virtual billiards room. To that end, the view region 212 includes a representation of the virtual billiards game (including a representation of the virtual table 221, a representation of the first virtual ball 222A, a representation of the second virtual ball 222B, a representation of the third virtual ball 222C, a representation of the first virtual cue stick 223A, and a representation of the second virtual cue stick 223B) and a representation of the virtual jukebox 224.

Figure 2B:
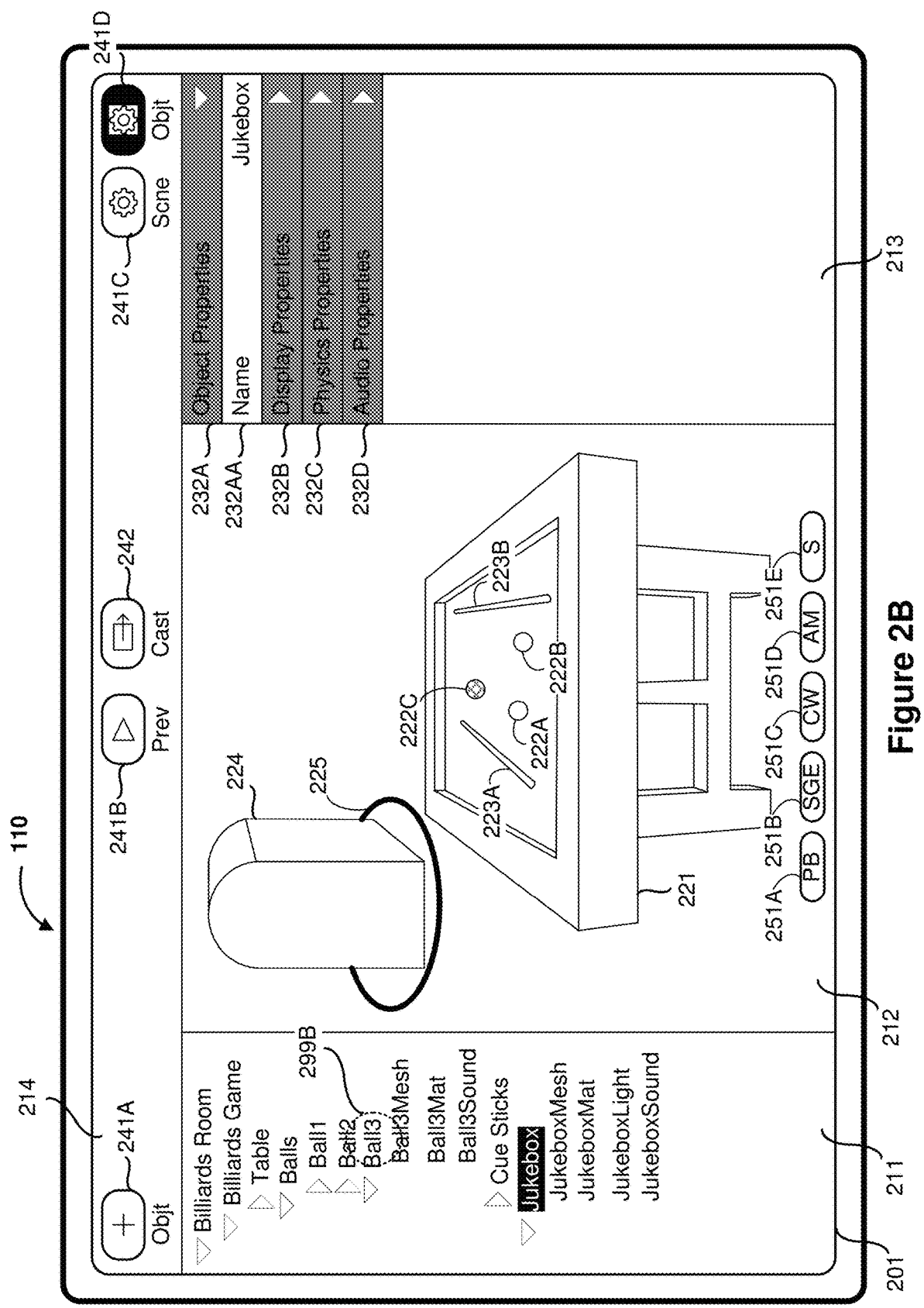
FIG. 2Z illustrates a particular electronic device displaying a stereoscopic preview of the scene.

The settings region 213 includes, as illustrated in FIG. 2A, a plurality of scene settings manipulation affordances or, as illustrated in FIG. 2B, a plurality of object settings manipulation affordance depending on whether the scene settings affordance 214C in the toolbar region 214 or the object settings affordance 241D in the toolbar region 214 is selected. In FIG. 2A, the different display of the scene settings affordance 241C as compared to the object settings affordance 241D and other affordances of the toolbar region 214 indicates that the scene settings affordance 241C is selected. Accordingly, the settings region 213 includes a number of scene settings manipulation affordances presented via collapsible and expandable scene setting menus 231A-231E. In FIG. 2A, an exemplary scene setting manipulation affordance, the scene name manipulation affordance 231AA for changing a name of the XR scene is shown.

The scene settings menus 231A-231E include a scene properties menu 231A including scene settings manipulation affordances for changing scene properties of the XR scene such as a name of the XR scene, an anchor properties menu 231B including scene setting manipulation affordances for changing anchor properties of the XR scene such as whether the XR scene is displayed on a detected horizontal surface, detected vertical surface, or detected object, a global physics properties menu 231C including scene setting manipulation affordances for changing physics properties of the XR scene such as whether objects of the XR scene interact and/or a presence and/or strength of gravity, a global audio properties menu 231D including scene setting manipulation affordances for changing audio properties of the XR scene such as a sound to be played while the XR scene is presented, e.g., a soundtrack, or audio effects to be applied to real sounds detected while the XR scene is presented, e.g., a reverb or an attenuation, and a global lighting properties menu 231E for changing lighting properties of the XR scene such as a directional or omnidirectional light to be rendered when the XR scene is presented or how real light affects display of XR objects of the XR scene. In various implementations, the settings region 213 includes additional and/or fewer scene settings menus and/or scene settings manipulation affordances.

The toolbar region 214 includes an object addition affordance 241A for adding objects to the XR scene, a preview affordance 241B for previewing the XR scene, a casting affordance 242 for casting the XR scene to another electronic device for presentation, the scene settings affordance 341C for displaying scene setting manipulation affordances in the settings region 213, and the object settings affordance 241D for displaying object setting manipulation affordances in the settings region 213. In various implementations, the toolbar region 214 includes additional and/or fewer affordances.

At the bottom of the GUI 201, a plurality of studio affordances 251A-251E are displayed which, when activated, causes display of a studio region 215 at the bottom of the GUI 201. The studio affordances 251A-251E include a project browser affordance 251A for causing display of a project browser user interface in the studio region 215, a shader graph editor affordance 251B for causing display of a shader graph editor user interface in the studio region 215, a code workshop affordance 251C for causing display of a code workshop user interface in the studio region 215, an audio mixer affordance 251D for causing display of an audio mixer user interface in the studio region 215, and a statistics affordance 251E for causing display of a statistics user interface in the studio region 215.

FIG. 2A illustrates a user input 299A directed to the representation of the virtual jukebox 224. In various implementations, the user input 299A is input by a user tapping a finger or stylus on a touch-sensitive display at the location of the representation of the virtual jukebox 224. In various implementations, the user input 299A is input by a user clicking a mouse button while a cursor is displayed at the location of the representation of the virtual jukebox 224.

FIG. 2B illustrates the GUI 201 of FIG. 2A in response to detecting the user input 299A directed to the representation of the virtual jukebox 224. In response to detecting the user input 229A directed to the representation of the virtual jukebox 224, the virtual jukebox is selected. Accordingly, in the assets region 211, the virtual jukebox is highlighted in the list of assets. Further, in the view region 212, a selection indicator 225 is displayed in association with the representation of the virtual jukebox 224. In FIG. 2B, the selection indicator 225 is displayed as a ring surrounding the representation of the virtual jukebox 224. In response to selection of the virtual jukebox (or any object in the XR scene), the scene settings affordance 241C in the toolbar region 214 is deselected and the object settings affordance 241D in the toolbar region 214 is selected. Accordingly, the settings region 213 includes a plurality of object setting manipulation affordances presented via collapsible and expandable object setting menus 232A-232D. In FIG. 2B, an exemplary object setting manipulation affordance, the object name manipulation affordance 232AA for changing a name of the currently selected object is shown. Like the selection indicator 225 displayed in association with the representation of the virtual jukebox 224, the object name manipulation affordance 232AA displaying the name of the virtual jukebox (e.g., "Jukebox") indicates that the virtual jukebox is selected.

The object settings menus 232A-232D include an object properties menu 232A including object settings manipulation affordances for changing object properties of the currently selected object such as a name of the object, a display properties menu 232B including display setting manipulation affordances for changing display or rendering properties of the currently selected object such as a shape, color, or optical transmission of the object, a physics properties menu 232C including object setting manipulation affordances for changing physics properties of the currently selected object such as light reflectivity of the object or elasticity of the object, and an audio properties menu 232D including object setting manipulation affordances for changing audio properties of the currently selected object. In various implementations, settings region 213 includes additional and/or fewer object settings menus and/or object settings manipulation affordances.

FIG. 2B illustrates a user input 299B directed to the third virtual ball in the list of assets in the assets region 211. In various implementations, the user input 299B is input by a user tapping a finger or stylus on a touch-sensitive display at the location of the third virtual ball in the list of assets in the assets region 211. In various implementations, the user input 299B is input by a user clicking a mouse button while a cursor is displayed at the location of the third virtual ball in the list of assets in the assets region 211.

Figure 2C:
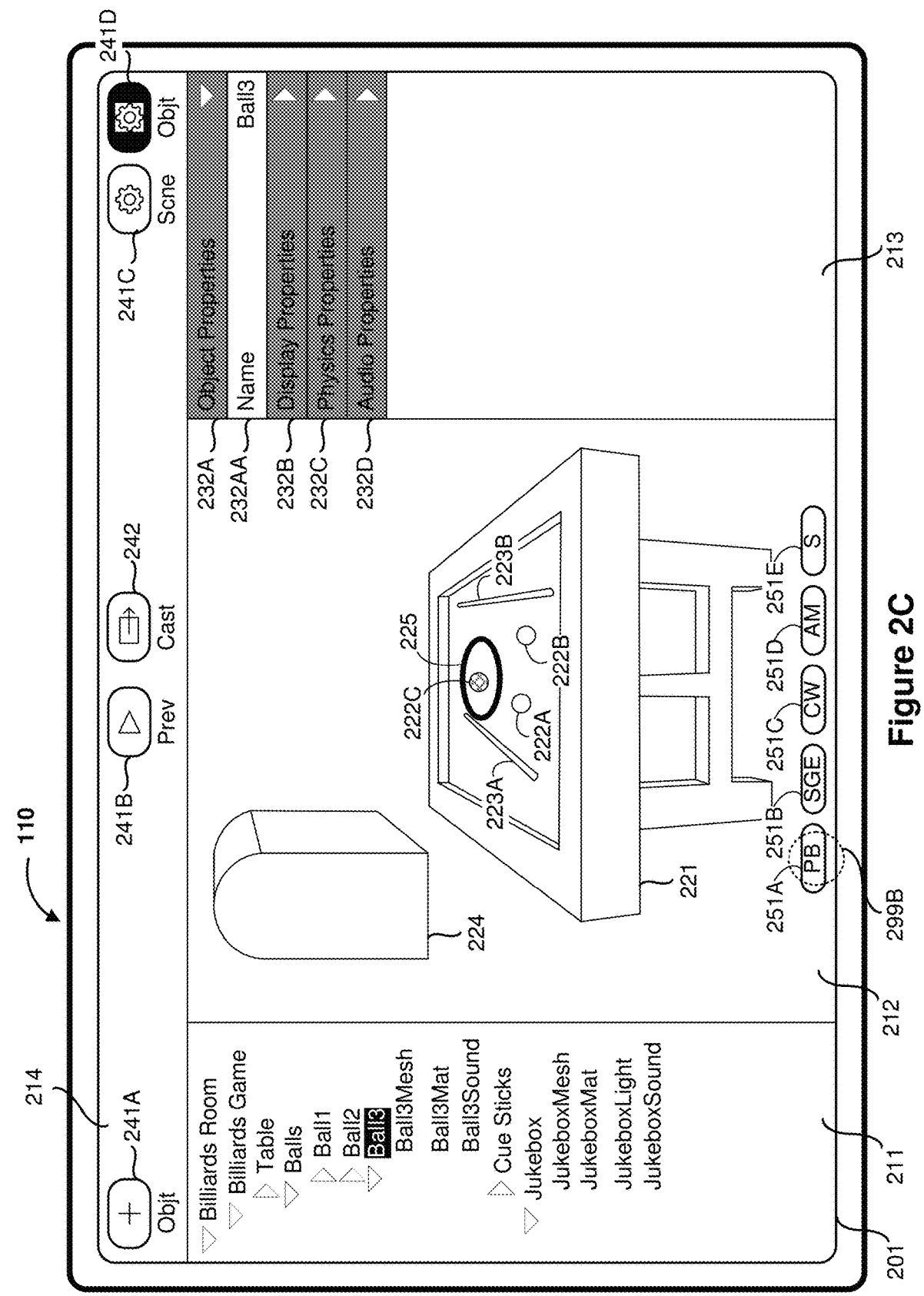

FIG. 2C illustrates the GUI 201 of FIG. 2B in response to detecting the user input 299B directed to the third virtual ball in the list of assets in the assets region 211. In response to detecting the user input 299B directed to the third virtual ball in the list of assets in the assets region 211, the third virtual ball is selected. Accordingly, in the assets region 211, the third virtual ball is highlighted in the list of assets. Further, in the view region 212, the selection indicator 225 is displayed in association with the representation of the third virtual ball 222C.

FIG. 2C illustrates a user input 299C directed to the project browser affordance 251A. In various implementations, the user input 299C is input by a user tapping a finger or stylus on a touch-sensitive display at the location of the project browser affordance 251A. In various implementations, the user input 299C is input by a user clicking a mouse button while a cursor is displayed at the location of the project browser affordance 251A.

Figure 2D:
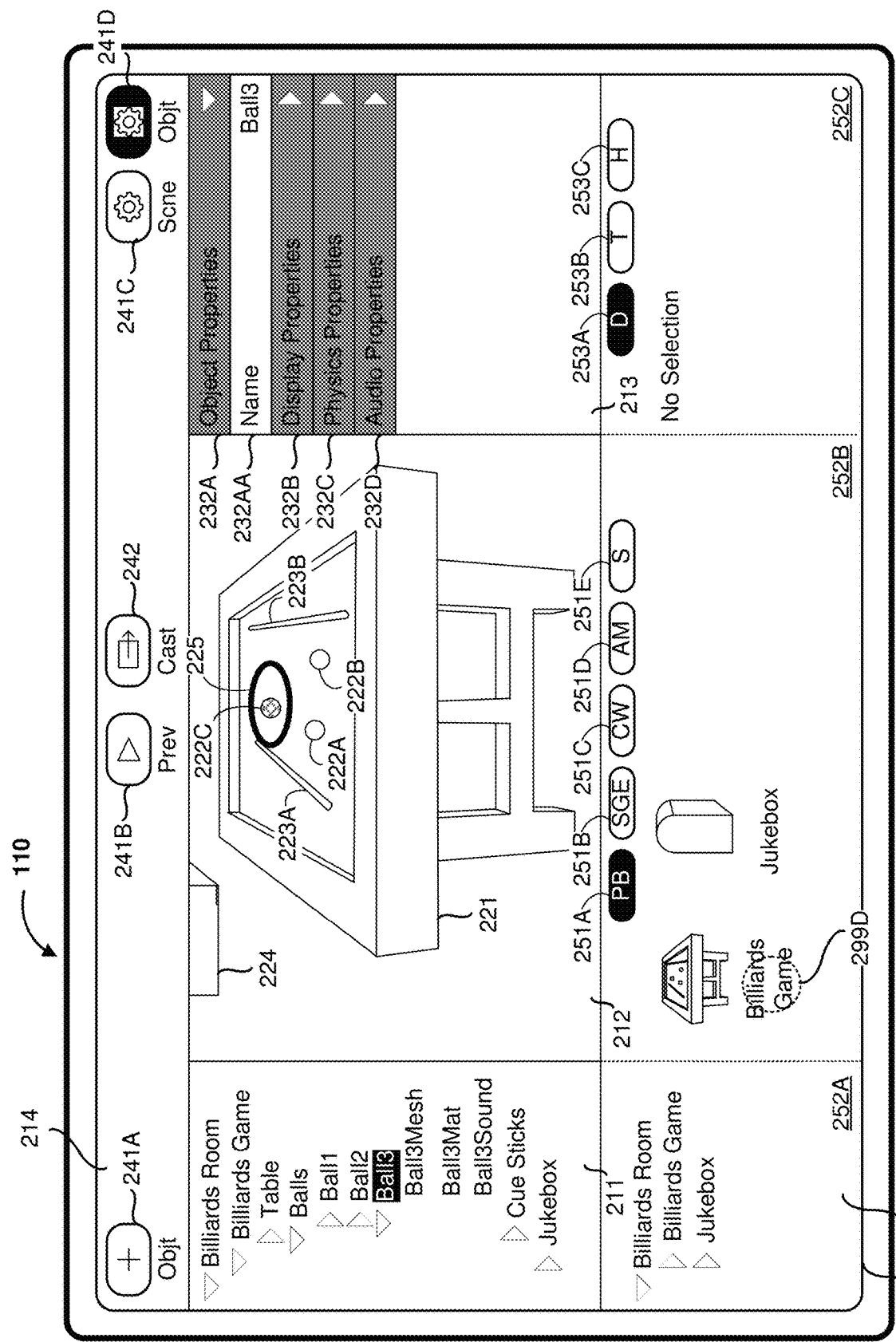

FIG. 2D illustrates the GUI 201 of FIG. 2C in response to detecting the user input 299C directed to the project browser affordance 251A. In response to detecting the user input 299C directed to the project browser affordance 251A, the GUI 201 includes a studio region 215 displaying a project browser user interface. Further, the project browser affordance 251A is displayed differently than the other studio affordances 251B-251E to indicate that the project browser affordance 251A is selected and that the studio region 215 is displaying the project browser user interface.

The project browser user interface includes a project browser assets region 252A, a project browser view region 252B, and a project browser information region 252C. The project browser assets region 252A, like the assets region 211, displays a list of assets associated with the XR scene in a hierarchical manner. However, whereas selecting an asset in the assets region 211 selects the corresponding asset (e.g., a virtual object) for manipulation in the view region 212 or the settings region 213, selecting an asset in the project browser assets region 252A does not select the corresponding asset for manipulation. Rather, selection of the asset in the project browser assets region 252A selects the asset for displaying information regarding the asset in the project browser view region 252B and the project browser information region 252C as described in detail below.

The project browser view region 252B displays, as icons, representations of the assets of the XR scene in a hierarchical manner. Thus, in FIG. 2D, the project browser view region 252B displays a first icon representing the virtual billiards game (labeled "Billiards Game") and a second icon representing the virtual jukebox (labeled "Jukebox").

The project browser information region 252C displays information regarding the asset selected within the project browser user interface. As no asset has been selected, the project browser information region 252C does not display information regarding an asset. The project browser information region 252C includes a plurality of information affordances 253A-253C which, when selected, display different information regarding the asset selected in the project browser user interface. The plurality of information affordances 253A-253C include a details affordance 253A which, when selected, causes display, in the project browser information region 252C, of details regarding the asset selected in the project browser user interface, a type affordance 253B which, when selected, causes display, in the project browser information region 252C, of assets of a selected type included in the asset selected in the project browser user interface, and a hierarchy affordance 253C which, when selected, causes display, in the project browser information region 252C, of a hierarchy of the assets including the asset selected in the project browser user interface.

FIG. 2D illustrates a user input 299D directed to the first icon. In various implementations, the user input 299D is input by a user tapping a finger or stylus on a touch-sensitive display at the location of the first icon. In various implementations, the user input 299D is input by a user clicking a mouse button while a cursor is displayed at the location of the first icon.

Figure 2E:
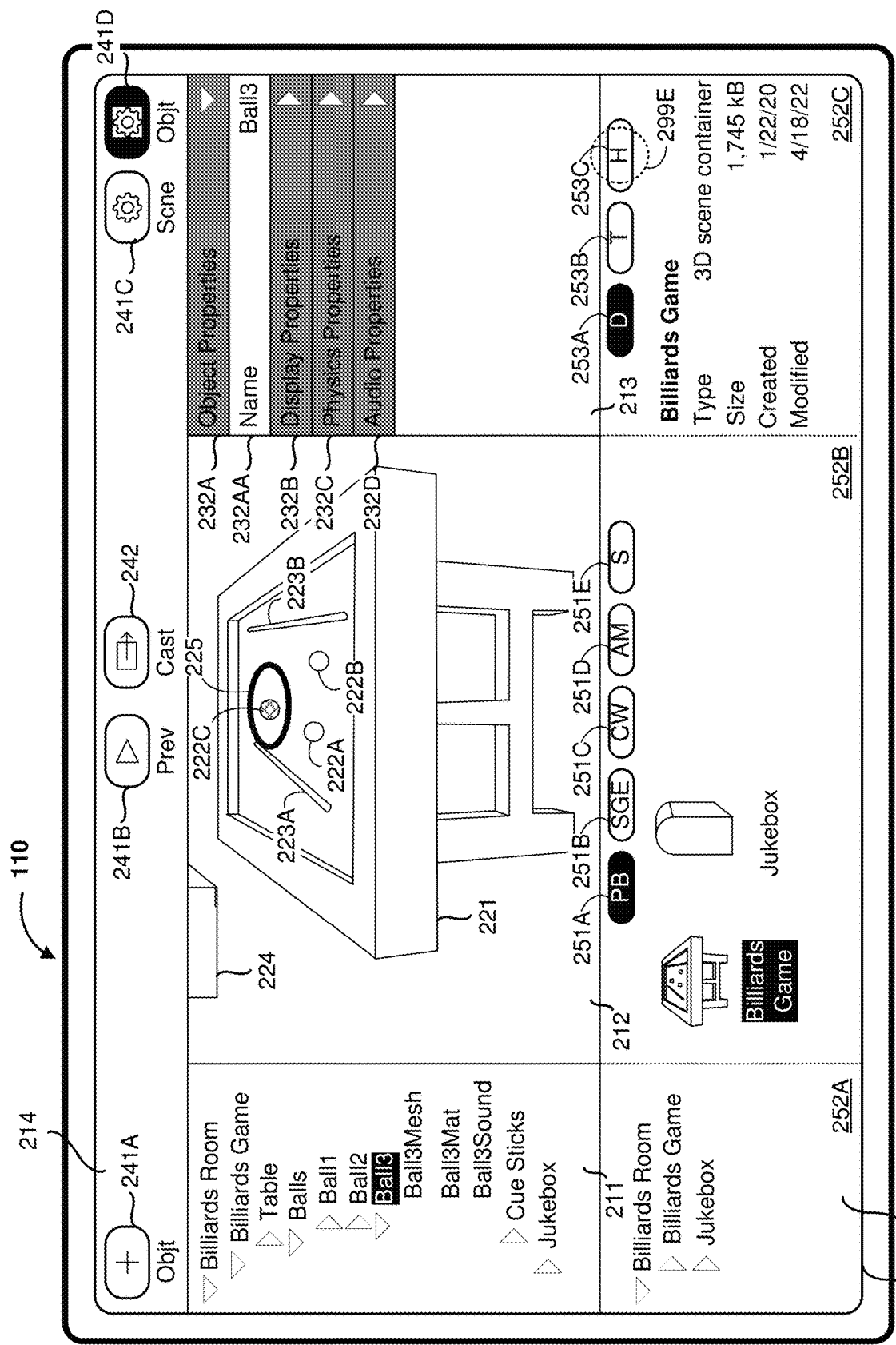

FIG. 2E illustrates the GUI 201 of FIG. 2D in response to detecting the user input 299D directed to the first icon. In response to detecting the user input 299D directed to the first icon, the virtual billiards game is selected in the project browser user interface. Accordingly, the first icon is highlighted to indicate that virtual billiards game is selected in the project browser user interface. Further, the project browser information region 252C displays information regarding the virtual billiards game. Although the virtual billiards game is selected in the project browser user interface, the third virtual ball remains selected in the assets region 211, the view region 212, and the settings region 213.

Upon selection in the project browser user interface of the virtual billiards game and with the details affordance 253C selected, the project browser information region 252C includes details regarding the virtual billiards game, such as a name of the file ("Billiards Game"), a file type of the file, a size of the file, a date the file was created, and a date the file was last modified. In various implementations, the project browser information region 252C includes additional and/or fewer details regarding the asset selected in the project browser user interface.

FIG. 2E illustrates a user input 299E directed to the hierarchy affordance 253C. In various implementations, the user input 299E is input by a user tapping a finger or stylus on a touch-sensitive display at the location of the hierarchy affordance 253C. In various implementations, the user input 299E is input by a user clicking a mouse button while a cursor is displayed at the location of the hierarchy affordance 253C.

Figure 2F:
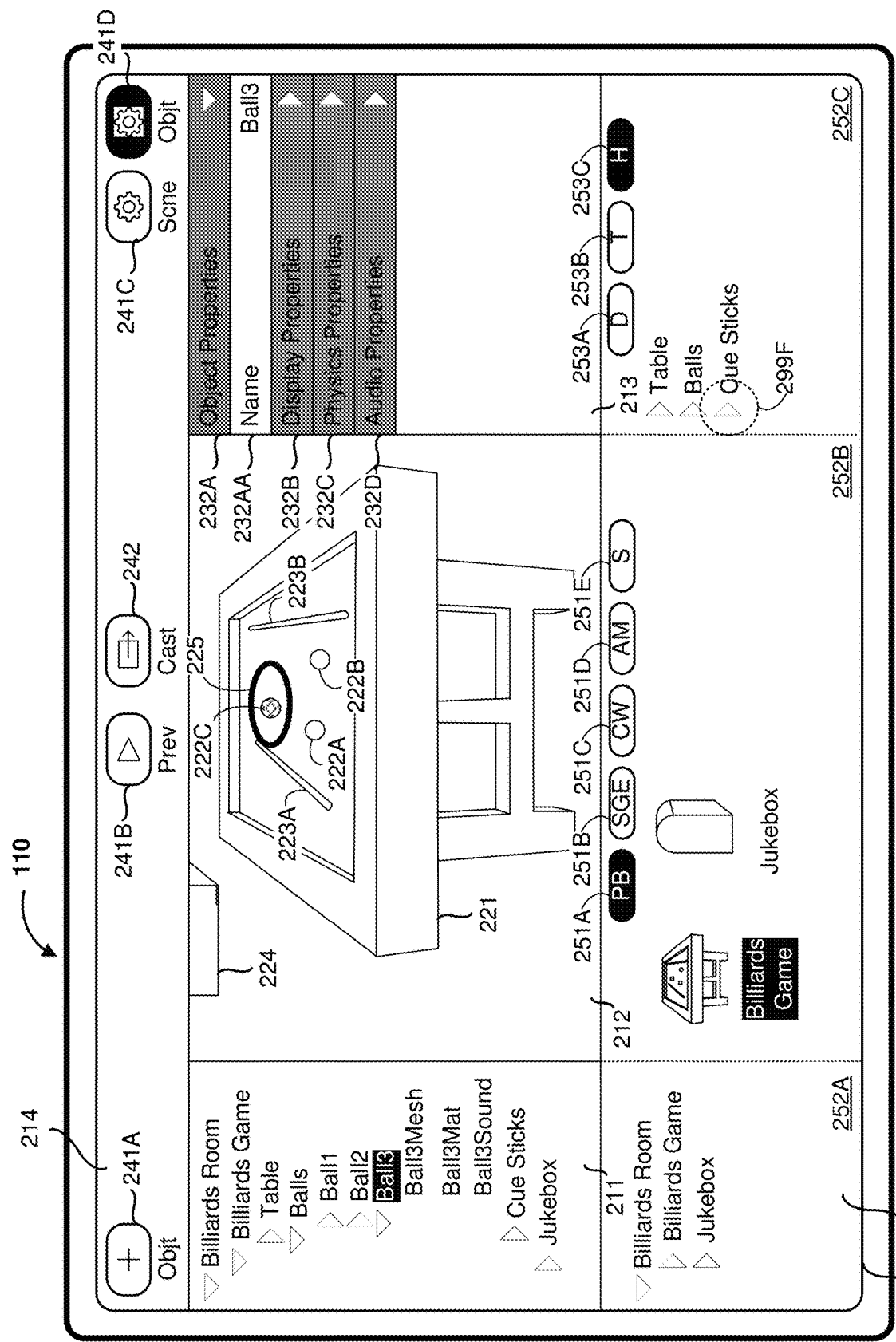

FIG. 2F illustrates the GUI 201 of FIG. 2E in response to detecting the user input 299E directed to the hierarchy affordance 253C. In response to detecting the user input 299E directed to the hierarchy affordance 253C, the hierarchy affordance 253C is selected (and the details affordance 253A is deselected). In response to selection of the hierarchy affordance 253C, the project browser information region 252C includes a hierarchy of the assets including the asset selected in the project browser user interface. In particular, in FIG. 2F, the project browser information region 252C displays a listing including the virtual table file, the virtual balls file, and the virtual cue sticks file.

FIG. 2F illustrates a user input 299F directed to the virtual cue sticks file in the listing in the project browser information region 252C. In various implementations, the user input 299F is input by a user tapping a finger or stylus on a touch-sensitive display at the location of the virtual cue sticks file. In various implementations, the user input 299F is input by a user clicking a mouse button while a cursor is displayed at the location of the virtual cue sticks file.

Figure 2G:
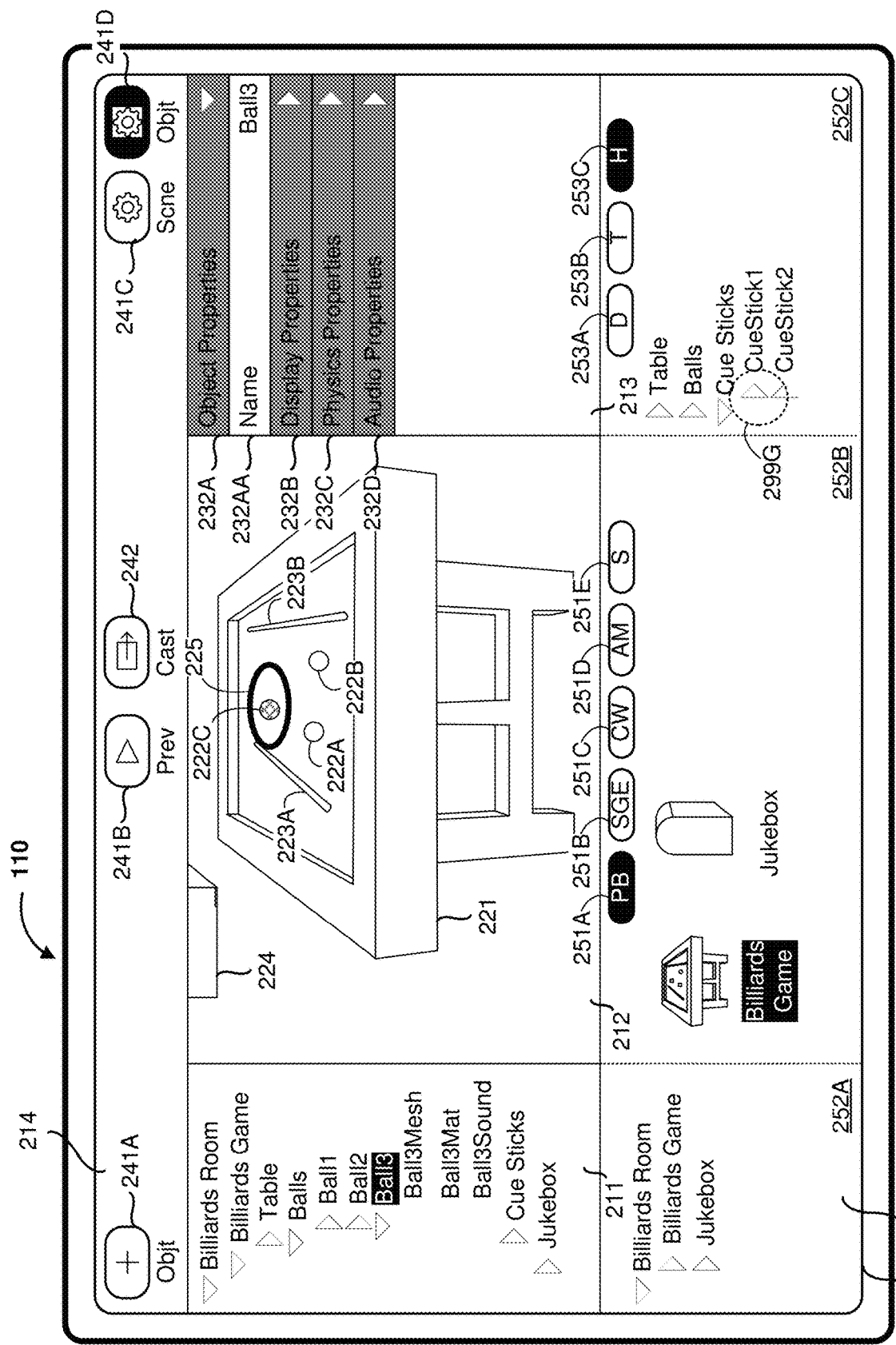

FIG. 2G illustrates the GUI 201 of FIG. 2F in response to detecting the user input 299F directed to the virtual cue sticks file. In response to detecting the user input 299F directed to the virtual cue sticks file, the virtual cue sticks file expands to display a list of the assets included in the virtual cue sticks file, namely a first virtual cue stick file and a second virtual cue stick file.

FIG. 2G illustrates a user input 299G directed to the first virtual cue stick file in the listing in the project browser information region 252C. In various implementations, the user input 299G is input by a user tapping a finger or stylus on a touch-sensitive display at the location of the first virtual cue stick file. In various implementations, the user input 299G is input by a user clicking a mouse button while a cursor is displayed at the location of the first virtual cue stick file.

Figure 2H:
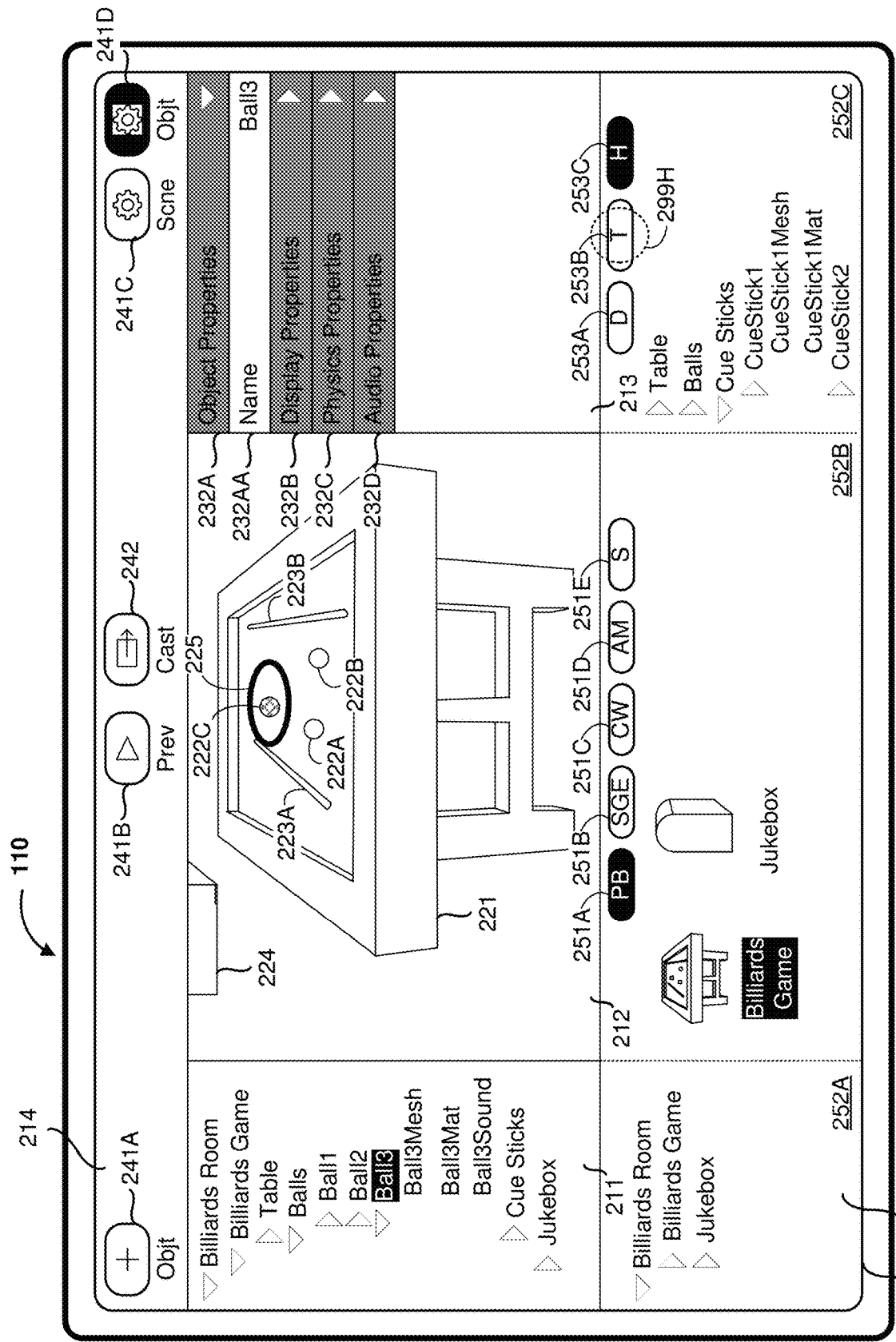

FIG. 2H illustrates the GUI 201 of FIG. 2G in response to detecting the user input 299G directed to the first virtual cue stick file. In response to detecting the user input 299F directed to the first virtual cue stick file, the first virtual cue stick file expands to display a list of the assets included in the first virtual cue stick file, namely the first virtual cue stick mesh file and the first virtual cue stick material file.

In various implementations, user input directed towards the first virtual cue stick mesh file or the first virtual cue stick material file provides a preview of the file or opens the file for editing.

FIG. 2H illustrates a user input 299H directed to the type affordance 253B. In various implementations, the user input 299H is input by a user tapping a finger or stylus on a touch-sensitive display at the location of the type affordance 253B. In various implementations, the user input 299H is input by a user clicking a mouse button while a cursor is displayed at the location of the type affordance 253B.

Figure 2I:
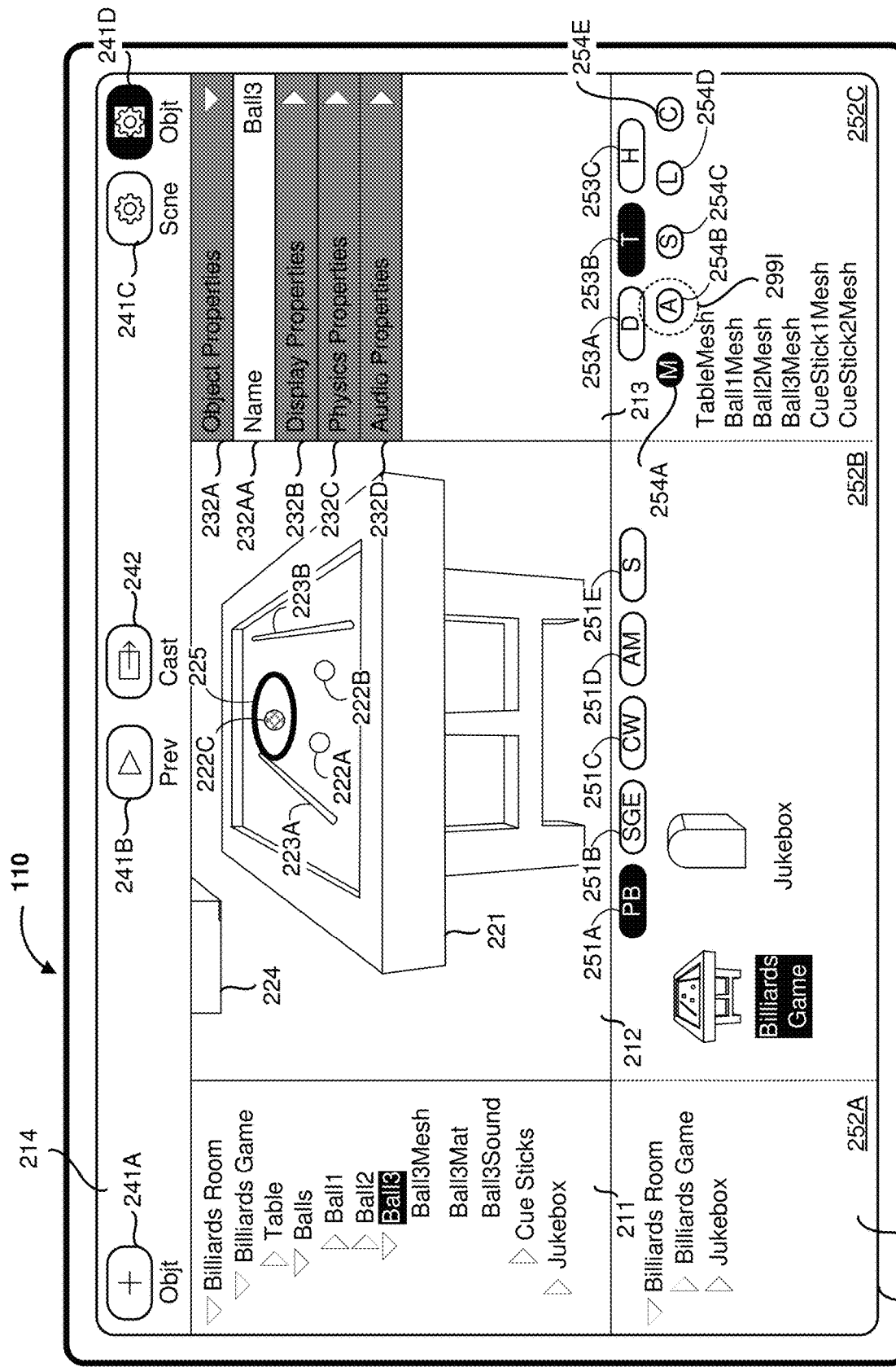

FIG. 2I illustrates the GUI 201 of FIG. 2H in response to detecting the user input 299H directed to the type affordance 253B. In response to detecting the user input 299H directed to the type affordance 253B, the type affordance 253B is selected (and the hierarchy affordance 253B is deselected). In response to selection of the type affordance 253B, the project browser information region 252C includes assets of a selected type included in the asset selected in the project browser user interface. In particular, in FIG. 2I, the selected type is mesh files and the project browser information region 252C displays a listing including the virtual table mesh file, the first virtual ball mesh file, the second virtual ball mesh file, the third virtual ball mesh file, the first virtual cue stick mesh file, and the second virtual cue stick mesh file.

In various implementations, user input directed towards one of the mesh files provides a preview of the file or opens the file for editing.

When the type affordance 253B is selected, the project browser information region 252C includes a plurality of type selection affordances 254A-254E for selecting different types of files to be displayed in the project browser information region 252C. The plurality of type selection affordances 254A-254E include a mesh affordance 254A for selecting a mesh file type, a material affordance 254B for selecting a material file type, a sound affordance 254C for selecting a sound file type, a lighting affordance 254D for selecting a lighting file type, and a code affordance 254E for selecting a code file type.

FIG. 2I illustrates a user input 299I directed to the material affordance 254B. In various implementations, the user input 299I is input by a user tapping a finger or stylus on a touch-sensitive display at the location of the material affordance 254B. In various implementations, the user input 299I is input by a user clicking a mouse button while a cursor is displayed at the location of the material affordance 254B.

Figure 2J:
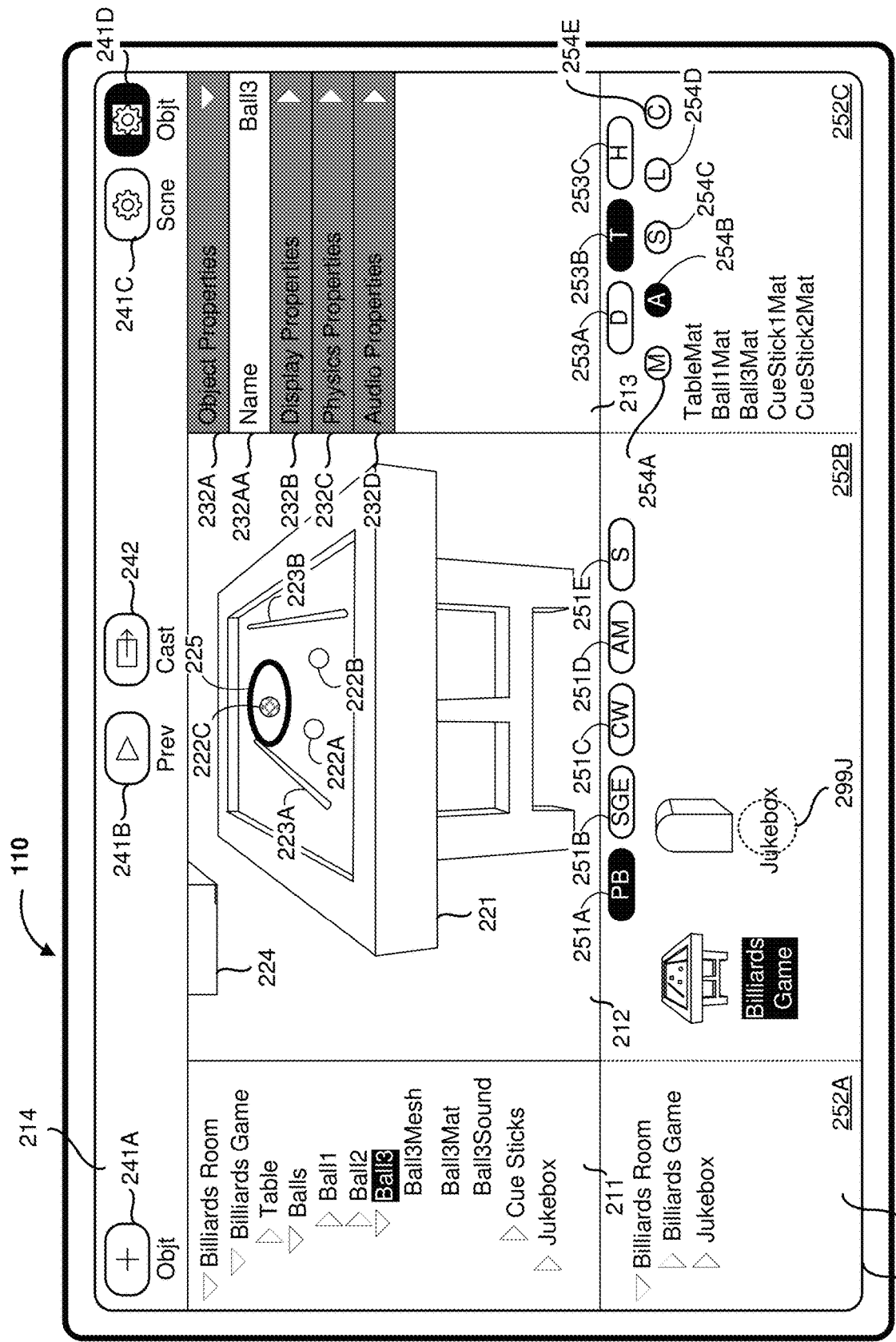

FIG. 2J illustrates the GUI 201 of FIG. 2I in response to detecting the user input 299I directed to the material affordance 254B. In response to detecting the user input 299I directed to the material affordance 254B, the material affordance 254B is selected (and the mesh affordance 254A is deselected). In response to selection of the material affordance 254B, the project browser information region 252C includes assets of a selected type included in the asset selected in the project browser user interface. In particular, in FIG. 2J, the selected type is material files and the project browser information region 252C displays a listing including the virtual table material file, the first virtual ball material file, the third virtual ball material file, the first virtual cue stick material file, and the second virtual cue stick material file.

Notably, the listing does not include a second virtual ball material file. Thus, by using the project browser interface and selecting the type affordance 253B, a user can quickly determine what assets are missing in the XR scene and import and/or create the assets. In various implementations, user input directed towards one of the materials files provides a preview of the file or opens the file for editing. Thus, a user can quickly find a file of a particular type for preview or editing.

FIG. 2J illustrates a user input 299J directed to the second icon. In various implementations, the user input 299J is input by a user tapping a finger or stylus on a touch-sensitive display at the location of the second icon. In various implementations, the user input 299J is input by a user clicking a mouse button while a cursor is displayed at the location of the second icon.

Figure 2K:
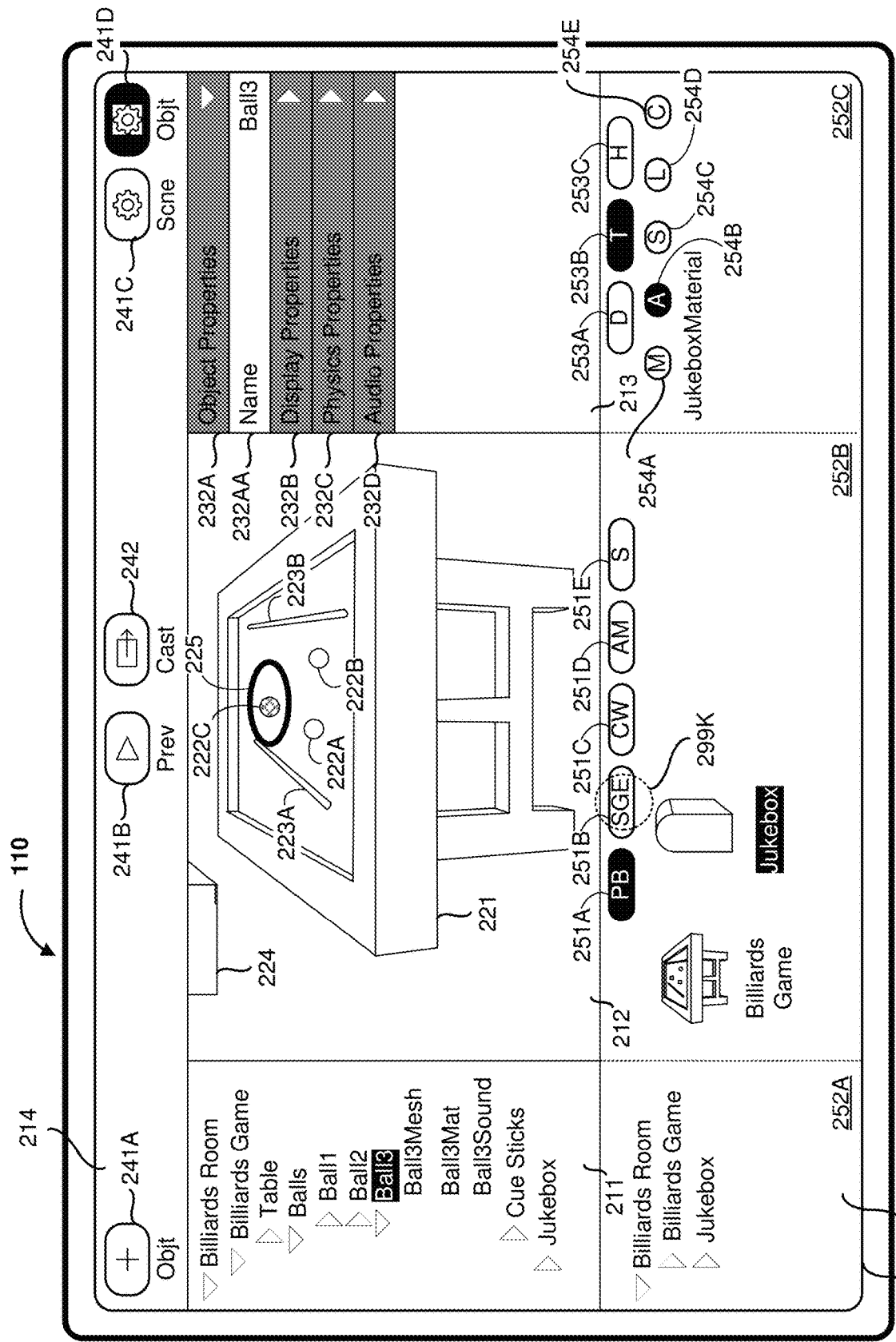

FIG. 2K illustrates the GUI 201 of FIG. 2J in response to detecting the user input 299J directed to the second icon. In response to detecting the user input 299J directed to the second icon, the virtual jukebox is selected in the project browser user interface. Accordingly, the second icon is highlighted (and the first icon is unhighlighted) to indicate that virtual jukebox is selected in the project browser user interface. Thus, the project browser information region 252C displays information regarding the virtual jukebox. In particular, because the type affordance 253B is selected and the material affordance 254B is selected, the project browser information region 252C includes a list of the material files included in the jukebox file. In FIG. 2J, this list includes a single file, the virtual jukebox material file.

FIG. 2K illustrates a user input 299K directed to the shader graph editor affordance 251B. In various implementations, the user input 299K is input by a user tapping a finger or stylus on a touch-sensitive display at the location of the shader graph editor affordance 251B. In various implementations, the user input 299K is input by a user clicking a mouse button while a cursor is displayed at the location of the shader graph editor affordance 251B.

Figure 2L:
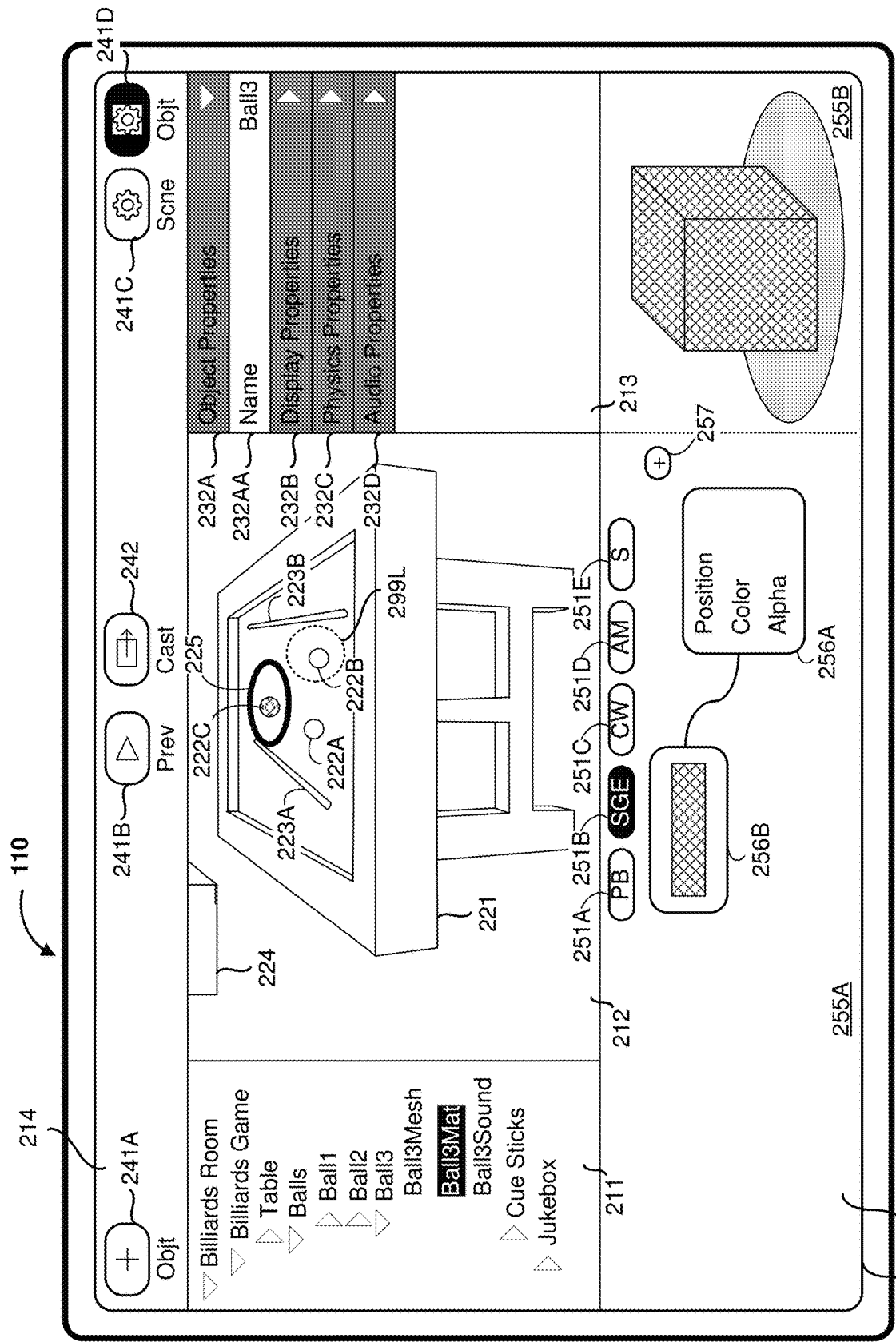

FIG. 2L illustrates the GUI 201 of FIG. 2K in response to detecting the user input 299K directed to the shader graph editor affordance 251B. In response to detecting the user input 299K directed to the shade graph editor affordance 251B, the project browser user interface in the studio region 215 is replaced with a shader graph editor user interface.

Further, in the assets region 211, the material asset associated with the selected asset is selected. Thus, the third virtual ball material file is selected.

The shader graph editor user interface includes a graph region 255A and a preview region 255B. The preview region 255B displays a representation of the material file on a default mesh. In FIG. 2L, the default mesh is a cube. The graph region 255A includes a shader graph including one or more nodes connected (at one or more ports) by one or more wires. In FIG. 2L, the shader graph includes a master node 256A with three input ports labeled "Position", "Color", and "Alpha". The shader graph includes a color node 256B with an output port coupled to the input port labeled "Color" of the master node 256A. The graph region 255A also includes an add-node affordance 257 for adding nodes to the shader graph.

FIG. 2L illustrates a user input 299L directed to the representation of the second virtual ball 222B. In various implementations, the user input 299L is input by a user tapping a finger or stylus on a touch-sensitive display at the location of the representation of the second virtual ball 222B. In various implementations, the user input 299L is input by a user clicking a mouse button while a cursor is displayed at the location of the representation of the second virtual ball 222B.

Figure 2M:
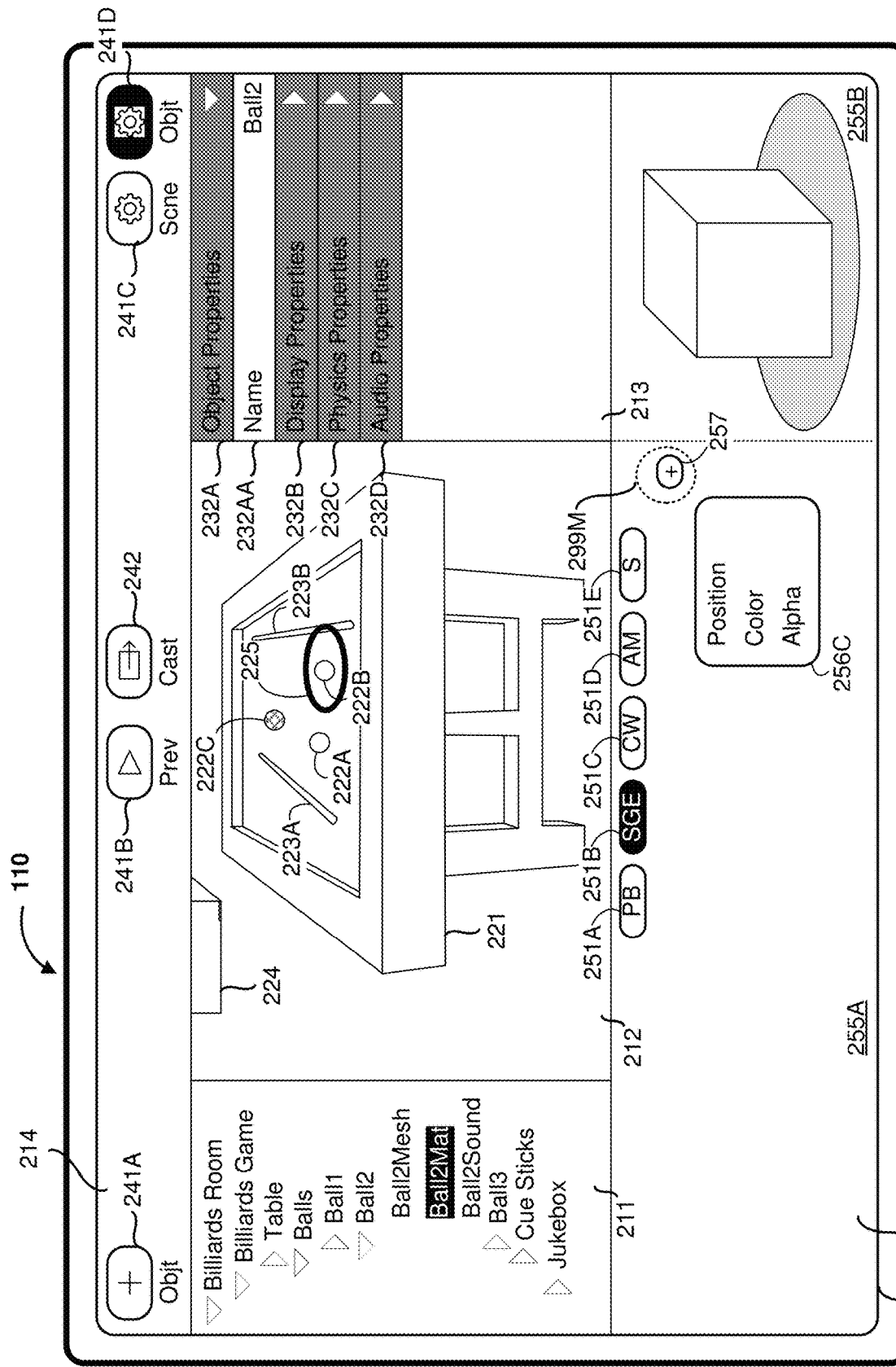

FIG. 2M illustrates the GUI 201 of FIG. 2L in response to detecting the user input 299L directed to the representation of the second virtual ball 222B. In response to detecting the user input 299L directed to the representation of the second virtual ball 222B, the second virtual ball is selected. With the shader graph editor affordance 251B selected, a new material is generated for the second virtual ball which appears highlighted in the assets region 211. Further, in the assets region 211, the material asset associated with the selected asset is selected. Thus, the second virtual ball mesh file is selected. Further, the selection indicator 225 is displayed in association with the representation of the second virtual ball 222B in the view region 212.

In the shader graph editor user interface displayed in the studio region 215, the shader graph includes a master node 256C.

FIG. 2M illustrates a user input 299M directed to the add-node affordance 257. In various implementations, the user input 299M is input by a user tapping a finger or stylus on a touch-sensitive display at the location of the add-node affordance 257. In various implementations, the user input 299M is input by a user clicking a mouse button while a cursor is displayed at the location of the add-node affordance 257.

Figure 2N:
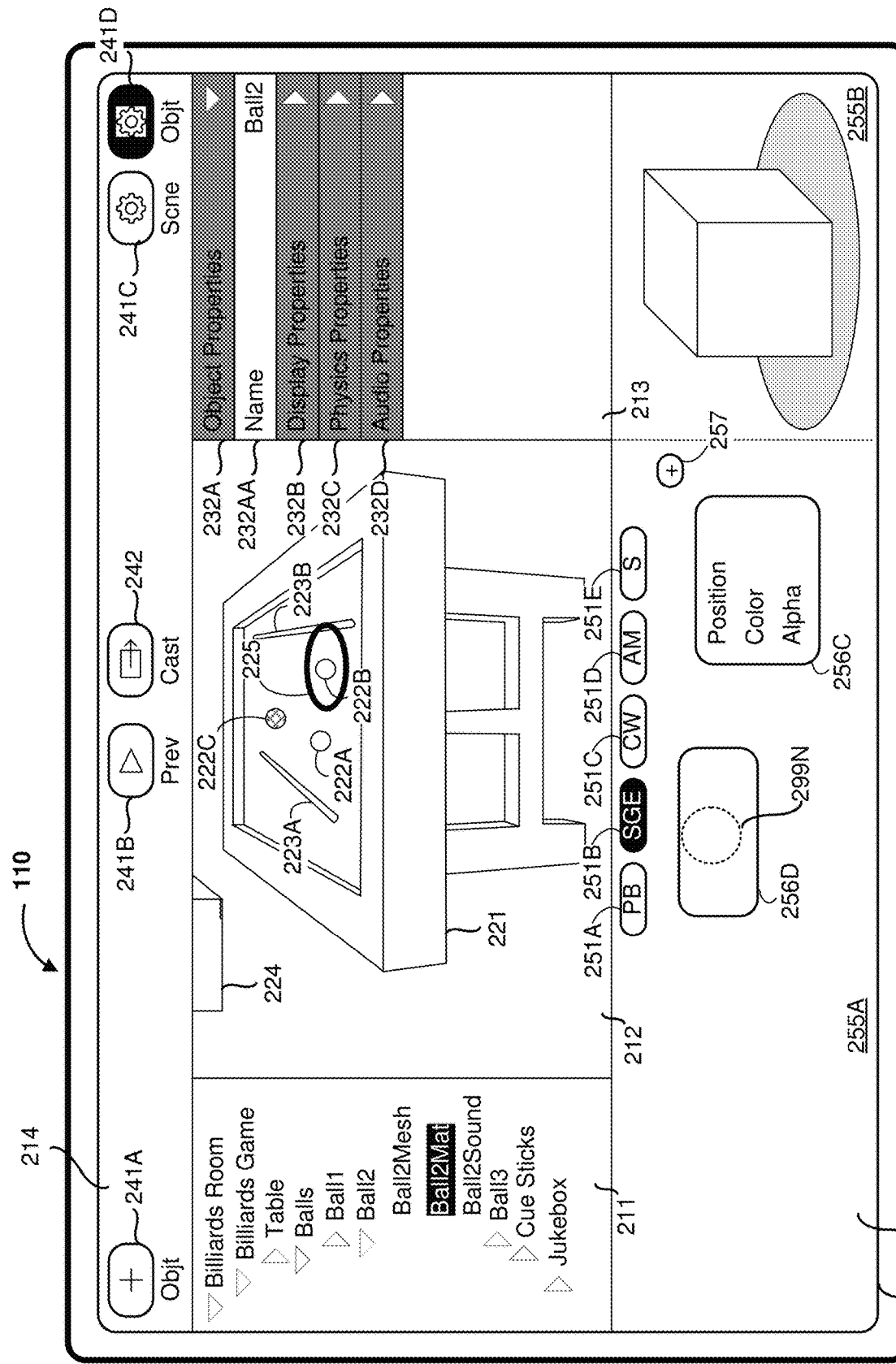

FIG. 2N illustrates the GUI 201 of FIG. 2M in response to detecting the user input 299M directed to the add-node affordance 257 and additional user input to select a node type. In response to detecting the user input 299M directed to the add-node affordance 257 and the additional user input to select a node type, the shader graph includes a first node 256D of the selected node type.

Although FIGS. 2M and 2N illustrate adding a node via the add-node affordance 257, nodes can be added via other user input, such as double-tapping (or double-clicking) an empty space in the graph region 255A or dragging from an input port of a node into an empty space in the graph region 255A. In various implementations, the user input to add a node includes a keyboard shortcut or selecting an add-node affordance from a menu accessed by right-clicking an empty space in the graph region 255A.

FIG. 2N illustrates a user input 299N directed to the first node 256D. In various implementations, the user input 299N is input by a user tapping a finger or stylus on a touch-sensitive display at the location of the first node 256D. In various implementations, the user input 299N is input by a user clicking a mouse button while a cursor is displayed at the location of the first node 256D.

Figure 2O:
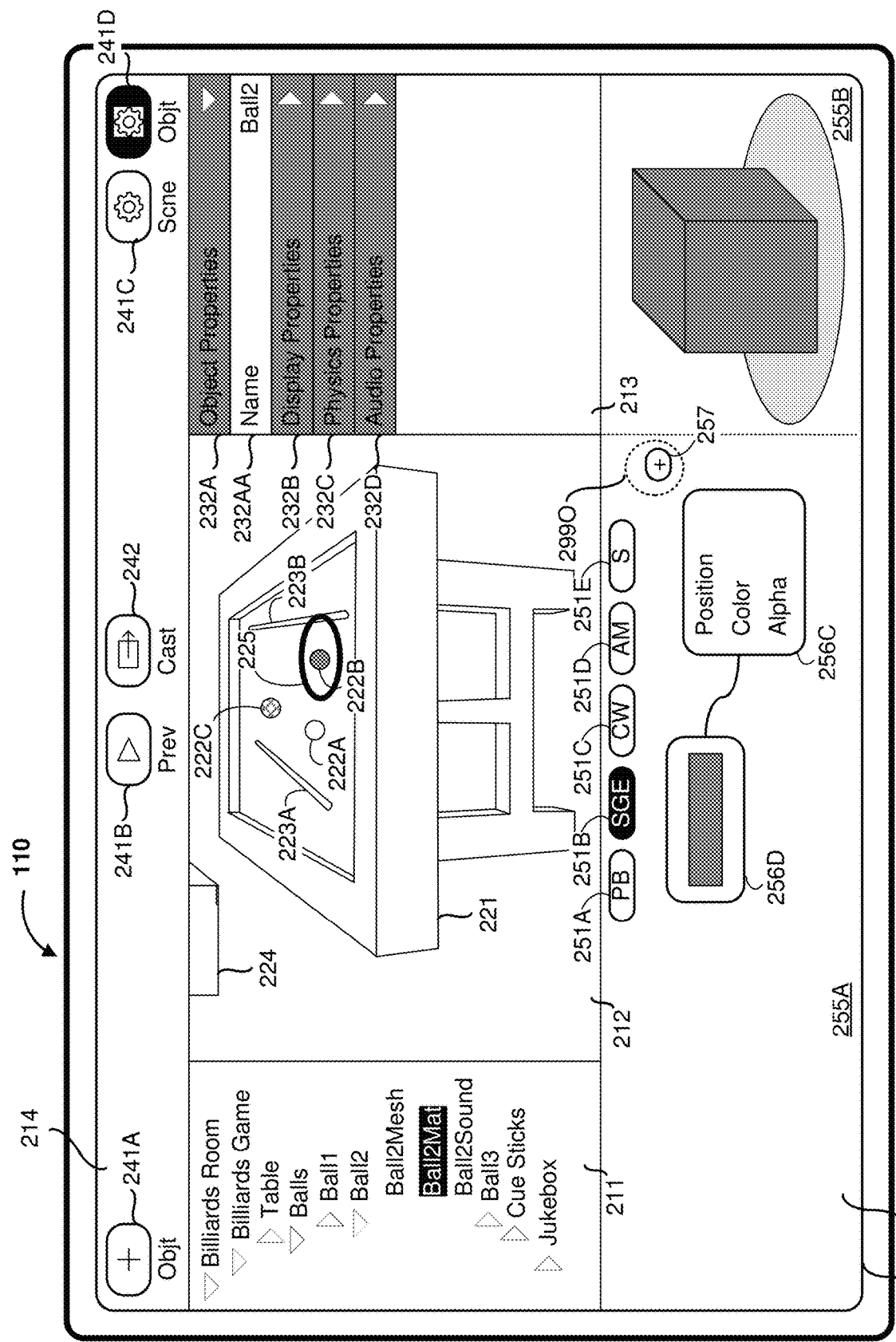

FIG. 2O illustrates the GUI 201 of FIG. 2N in response to detecting the user input 299N directed to the first node 256D and additional user input to (1) select a property for the first node 256D and (2) connect the output port of the first node 256D to the input port labeled "Color" of the master node 256C. In response to detecting the user input 299N directed to the first node 256D and the additional user input, the preview region 255B displays the representation of the material having the selected property. Further, the view region 212 displays the representation of the second virtual ball 222B having the selected property.

FIG. 2O illustrates a user input 299O directed to the add-node affordance 257. In various implementations, the user input 299O is input by a user tapping a finger or stylus on a touch-sensitive display at the location of the add-node affordance 257. In various implementations, the user input 299O is input by a user clicking a mouse button while a cursor is displayed at the location of the add-node affordance 257.

Figure 2P:
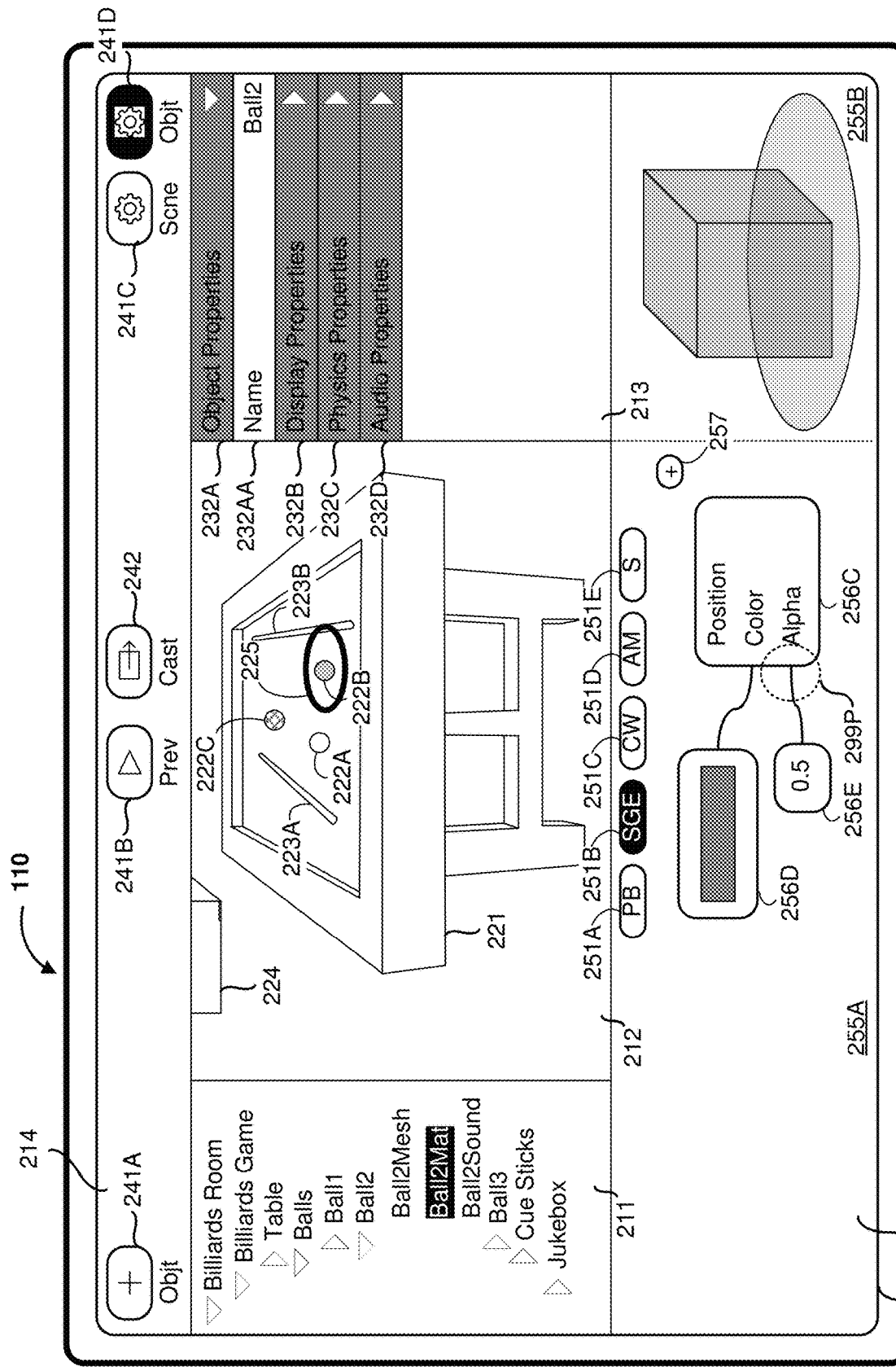

FIG. 2P illustrates the GUI 201 of FIG. 2O in response to detecting the user input 299O directed to the add-node affordance 257 and additional user input to select a node type to add a second node 256E of the selected node type, select a property for the second node 256E, and connect the output port of the second node 256E to the input port labeled "Alpha" of the master node 256C. In response to detecting the user input 299O directed to the add-node affordance 257 and the additional user input, the shader graph includes the second node 256E coupled to the master node 256C. The preview region 255B displays the representation of the material having the selected property. Further, the view region 212 displays the representation of the second virtual ball 222B having the selected property.

FIG. 2P illustrates a user input 299P directed to the wire coupling the second node 256E to the master node 256C. In various implementations, the user input 299P is input by a user tapping a finger or stylus on a touch-sensitive display at the location of the wire coupling the second node 256E to the master node 256C and moving away from the port. In various implementations, the user input 299P is input by a user clicking a mouse button while a cursor is displayed at the location of the wire coupling the second node 256E to the master node 256C and moving away from the port.

Figure 2Q:
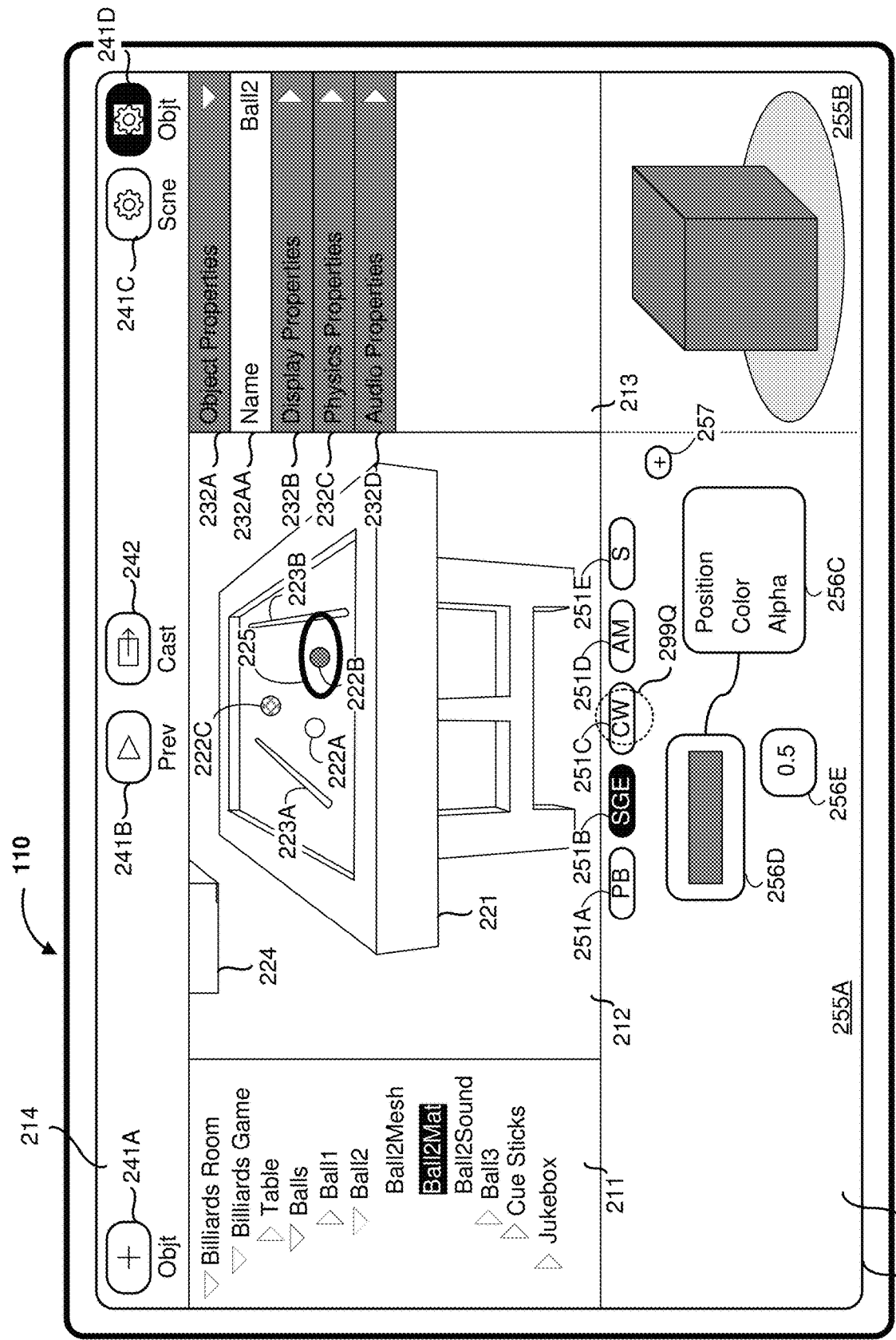

FIG. 2Q illustrates the GUI 201 of FIG. 2P in response to detecting the user input 299P directed to the wire coupling the second node 256E to the master node 256C. In response to the user input 299P directed to the wire coupling the second node 256E to the master node 256C the wire is removed. Accordingly, the second node 256E is no longer coupled to the master node 256C. The representation of the material in the preview region 255B and the representation of the second virtual ball 222B in the view region 211 reflect this change. Thus, by emulating pulling the wire out of the port, the wire is removed from the shader graph.

FIG. 2Q illustrates a user input 299Q directed to the code workshop affordance 251C. In various implementations, the user input 299Q is input by a user tapping a finger or stylus on a touch-sensitive display at the location of the code workshop affordance 251C. In various implementations, the user input 299Q is input by a user clicking a mouse button while a cursor is displayed at the location of the code workshop affordance 251C.

Figure 2R:
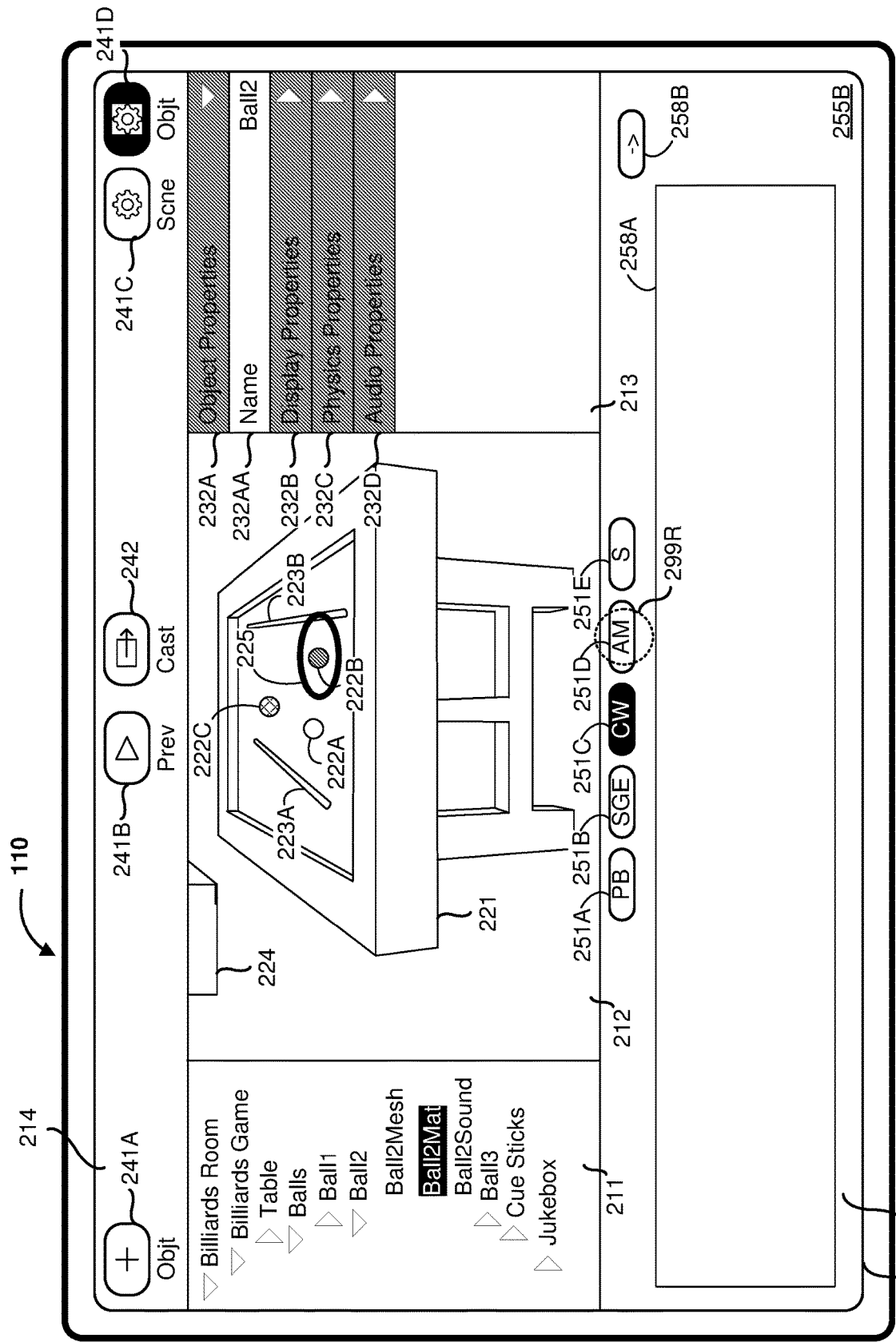

FIG. 2R illustrates the GUI 201 of FIG. 2Q in response to detecting the user input 299Q directed to the code workshop affordance 251C. In response to detecting the user input 299Q directed to the code workshop affordance 251C, the shader graph editor user interface in the studio region 215 is replaced with a code workshop user interface. The code workshop user interface includes a code editor 258A in which a user can enter code (e.g., using a keyboard). The code workshop user interface includes a code escape affordance 258B which opens a more powerful code editor.

FIG. 2R illustrates a user input 299R directed to the audio mixer affordance 251D. In various implementations, the user input 299R is input by a user tapping a finger or stylus on a touch-sensitive display at the location of the audio mixer affordance 251D. In various implementations, the user input 299R is input by a user clicking a mouse button while a cursor is displayed at the location of the audio mixer affordance 251D.

Figure 2S:
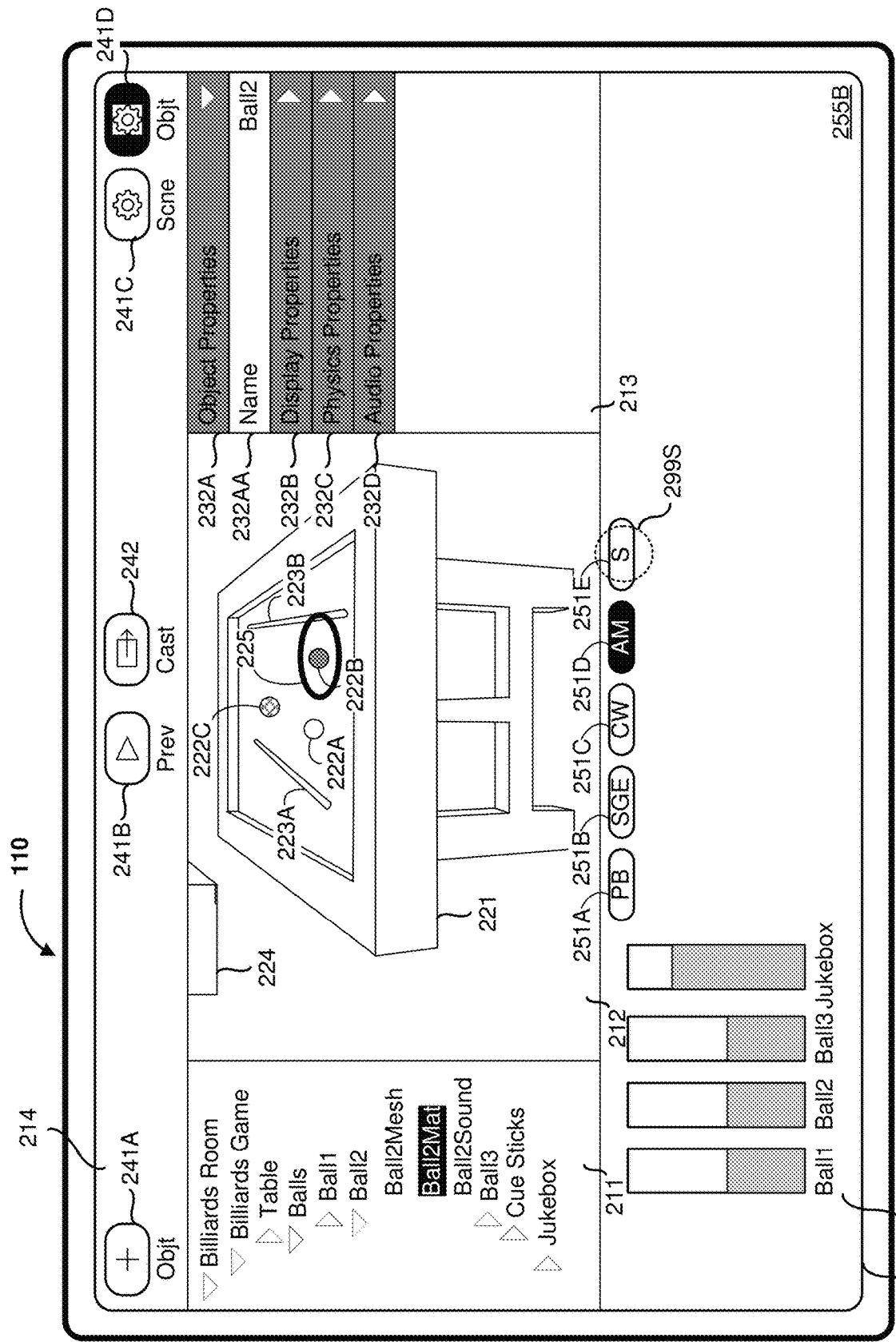

FIG. 2S illustrates the GUI 201 of FIG. 2R in response to detecting the user input 299R directed to the audio mixer affordance 251D. In response to detecting the user input 299R directed to the audio mixer affordance 251D, the code workshop user interface in the studio region 215 is replaced with an audio mixer user interface. The audio mixer user interface includes various affordances for manipulating various audio properties of the XR scene, such as the relative sound levels (volumes) of sounds or speed of playback of sounds.

FIG. 2S illustrates a user input 299S directed to the statistics affordance 251E. In various implementations, the user input 299S is input by a user tapping a finger or stylus on a touch-sensitive display at the location of the statistics affordance 251E. In various implementations, the user input 299S is input by a user clicking a mouse button while a cursor is displayed at the location of the statistics affordance 251E.

Figure 2T:
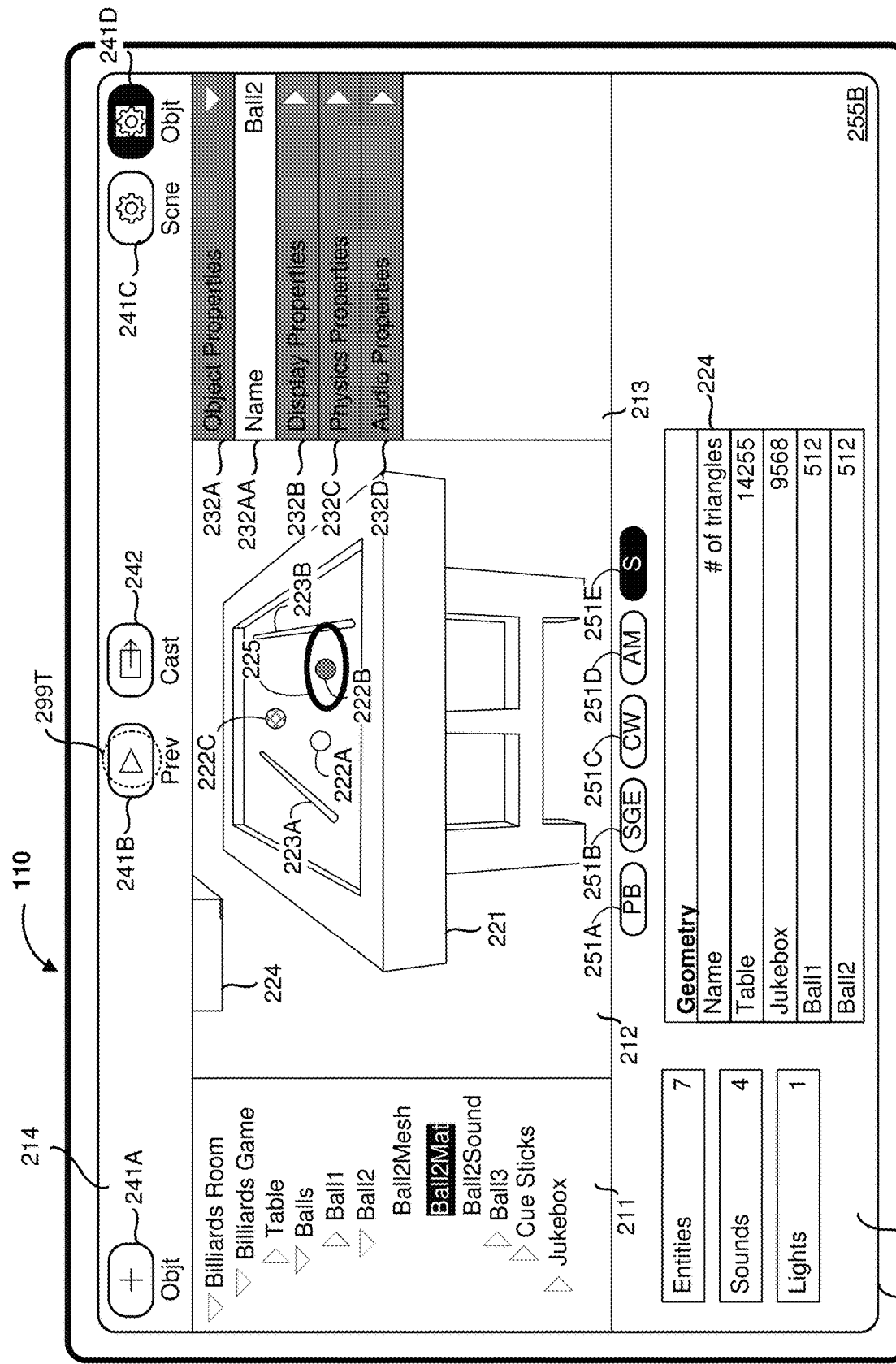

FIG. 2T illustrates the GUI 201 of FIG. 2S in response to detecting the user input 299S directed to the statistics affordance 251E. In response to detecting the user input 299S directed to the statistics affordance 251E, the audio mixer user interface in the studio region 215 is replaced with a statistics user interface. The statistics user interface includes various statistics regarding the XR scene, such as the number of entities (or objects), audio files, light sources, animations, shadows, etc. In various implementations, the statistics include a number of triangles, vertices, and/or meshes. In various implementations, the statistics include a table 259 listing the number of triangle (or vertices) of objects in the XR scene in descending order.

FIG. 2T illustrates a user input 299T directed to the preview affordance 241B. In various implementations, the user input 299T is input by a user tapping a finger or stylus on a touch-sensitive display at the location of the preview affordance 241B. In various implementations, the user input 299T is input by a user clicking a mouse button while a cursor is displayed at the location of the preview affordance 241B.

Figure 2U:
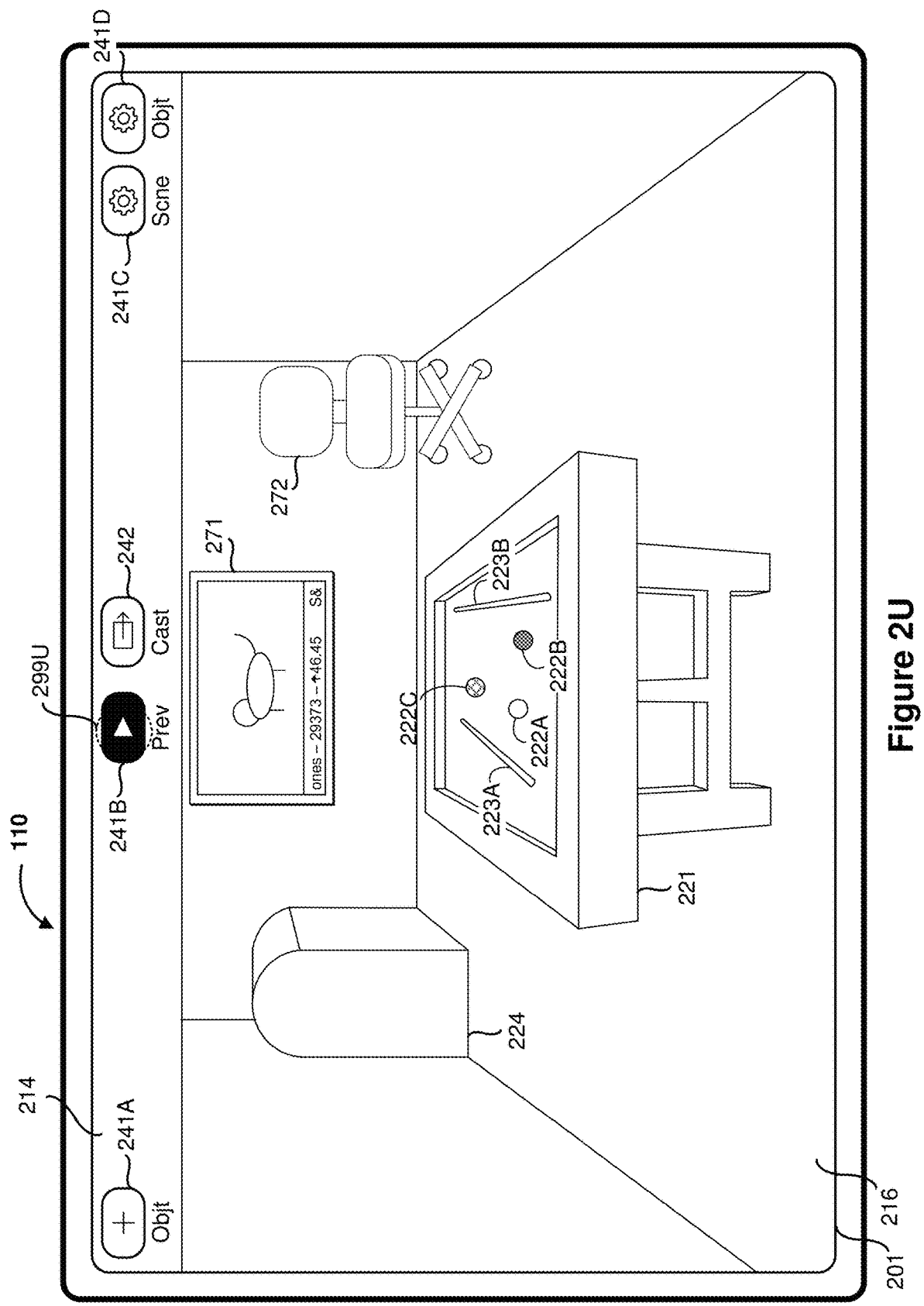

FIG. 2U illustrates the GUI 201 of FIG. 2T in response to detecting the user input 299T directed to the preview affordance 241B. In response to detecting the user input 299T directed to the preview affordance 241B, the assets region 211, the view region 212, the settings region 213, and the studio region 215 are replaced with preview region 216. The preview region 216 includes a preview of the XR scene. The preview of the XR scene is presented in conjunction with a physical environment (or a representation of a physical environment) including a physical television 271 and a physical chair 272. For example, in various implementations, the preview of the XR scene includes a composite image of a the XR scene rendered from a virtual camera perspective and an image of the physical environment captured from an image sensor perspective. In various implementations, moving the electronic device 110 moves the virtual camera perspective (and the image sensor perspective).

FIG. 2U illustrates a user input 299U directed to the preview affordance 241B. In various implementations, the user input 299U is input by a user tapping a finger or stylus on a touch-sensitive display at the location of the preview affordance 241B. In various implementations, the user input 299U is input by a user clicking a mouse button while a cursor is displayed at the location of the preview affordance 241B.

Figure 2V:
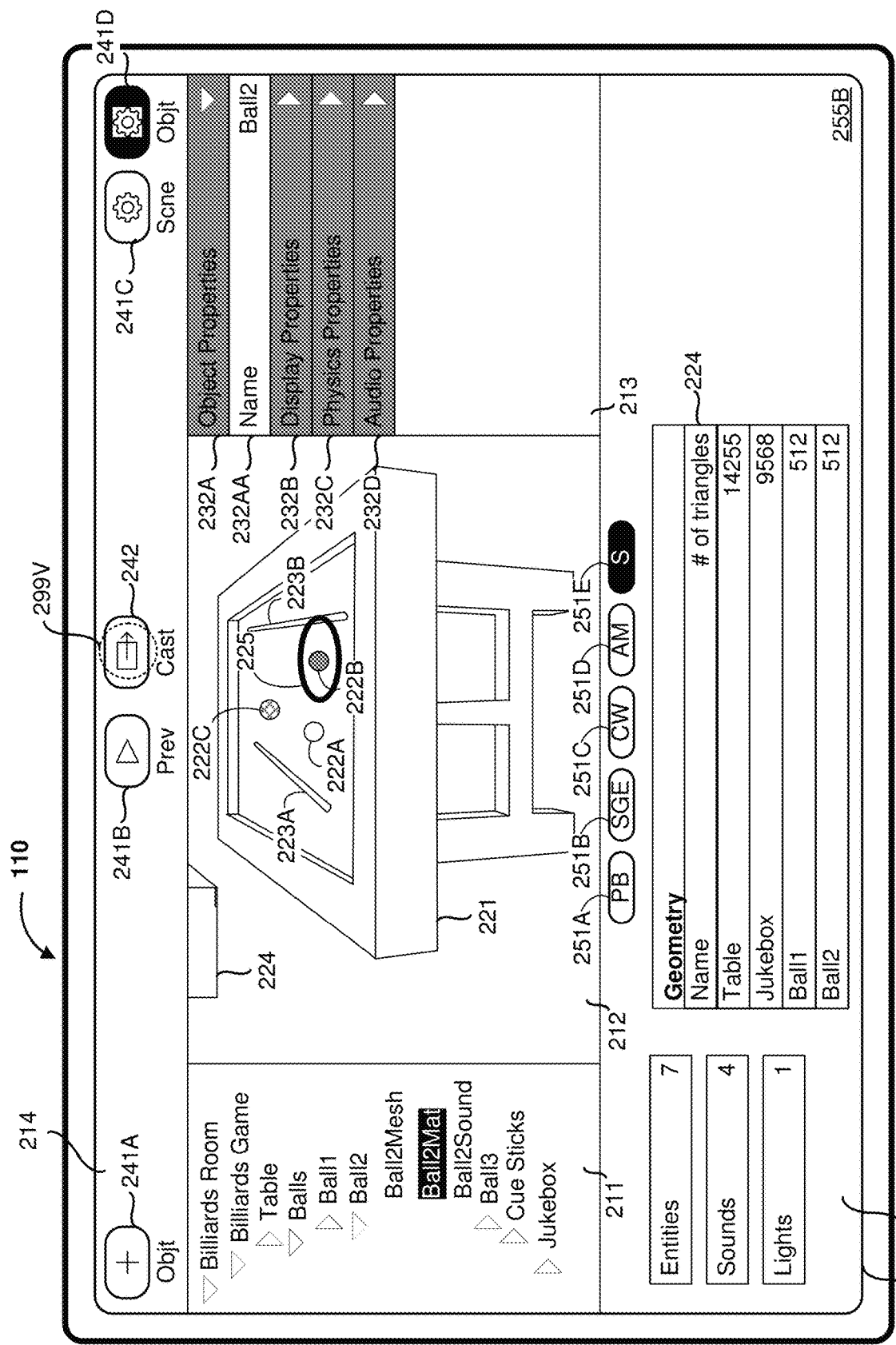

FIG. 2V illustrates the GUI 201 of FIG. 2U in response to detecting the user input 299T directed to the preview affordance 241B. In response to detecting the user input 299T directed to the preview affordance 241B, the preview region 216 is replaced with the assets region 211, the view region 212, the settings region 213, and the studio region 215.

FIG. 2V illustrates a user input 299V directed to the casting affordance 242. In various implementations, the user input 299V is input by a user tapping a finger or stylus on a touch-sensitive display at the location of the casting affordance 242. In various implementations, the user input 299V is input by a user clicking a mouse button while a cursor is displayed at the location of the casting affordance 242.

Figure 2W:
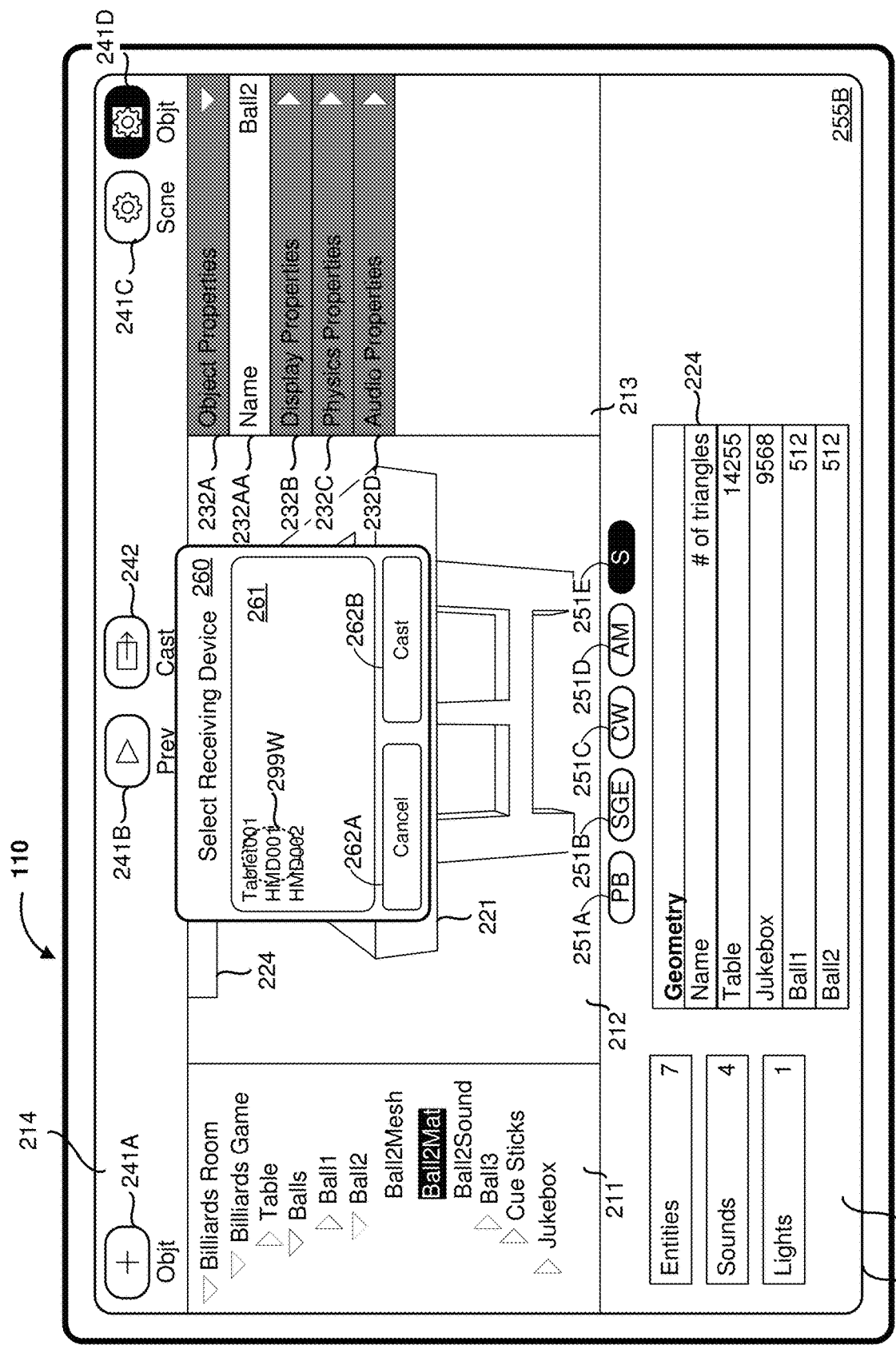

FIG. 2W illustrates the GUI 201 of FIG. 2V in response to detecting the user input 299V directed to the casting affordance 242. In response to detecting the user input 299V directed to the casting affordance 242, the GUI 201 includes a casting selection window 260. The casting selection window 260 includes a list of available electronic devices 261. In various implementations, the list of available electronic devices 261 includes electronic devices to which a container file of the assets of the XR scene can be transmitted.

In various implementations, the list of available electronic devices 261 includes electronic devices which are paired with the electronic device 110. In various implementations, the list of available electronic devices 261 which are powered on and in range to receive transmission of the container file. In various implementations, the list of available electronic devices 261 includes electronic devices which are associated with a user identifier that is also associated with the electronic device 110.

In various implementations, the list of available electronic devices 261 includes electronic devices for which the electronic device 110 has casting privileges. In various implementations, the electronic device 110 is granted casting privileges by the other electronic devices. In various implementations, the electronic device 110 has casting privileges by virtue of being associated with the same user identifier as a user identifier of the other electronic devices.

In various implementations, the list of available electronic devices 261 includes one or more stereoscopic devices capable of displaying a three-dimensional scene. In various implementations a stereoscopic device includes a left display for displaying an image to a left eye of a user and a right display for displaying an image to a right eye of a user. In various implementations, the list of available electronic devices 261 includes one or more monoscopic devices including only a single display.

In various implementations, the list of available electronic devices 261 includes one or more head-mounted devices, such as augmented reality glasses or an XR headset. In various implementations, the list of available electronic devices 261 includes one or more handheld devices, such as a smartphone or tablet.

The list of available electronic devices 261 is an affordance affording selection, by the user, of a particular electronic device from the list of available electronic devices 261. The casting selection window 260 includes a cancel affordance 262A for closing the casting selection window 260 and a cast affordance 262B for transmitting the container file of the assets of the XR scene to the selected particular electronic device.

FIG. 2W illustrates a user input 299W directed to the list of available electronic devices 261 selecting a particular electronic device named "HMD001". In various implementations, the user input 299W is input by a user tapping a finger or stylus on a touch-sensitive display at the location of the list of available electronic devices 261. In various implementations, the user input 299W is input by a user clicking a mouse button while a cursor is displayed at the location of the list of available electronic devices 261.

Figure 2X:
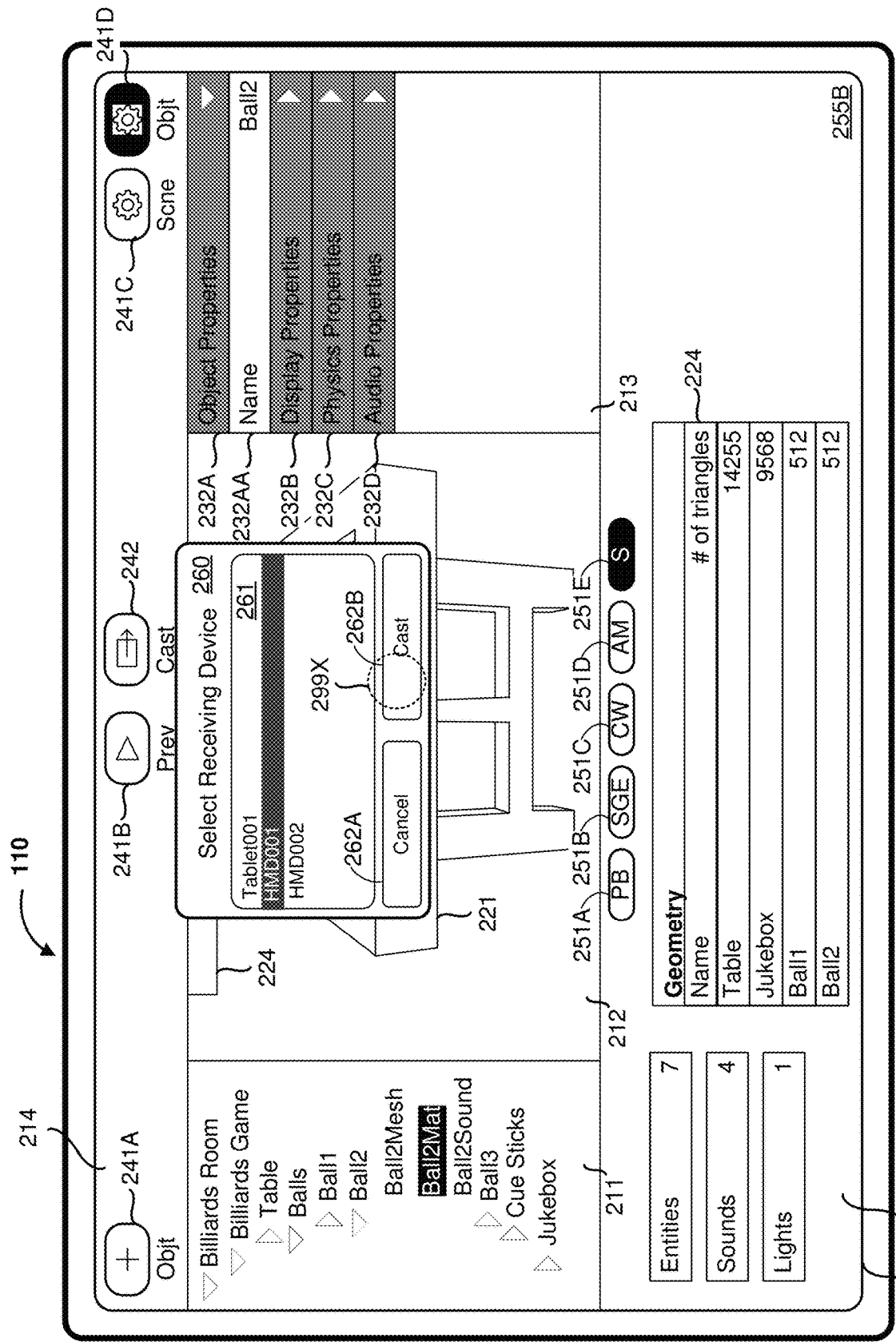

FIG. 2X illustrates the GUI 201 of FIG. 2W in response to detecting the user input 299W directed to the list of available electronic devices 261. In response to detecting the user input 299W directed to the list of available electronic devices 261, the particular electronic device named "HMD001" in the list of available electronic devices 261 is highlighted.

FIG. 2X illustrates a user input 299X directed to the cast affordance 262B. In various implementations, the user input 299X is input by a user tapping a finger or stylus on a touch-sensitive display at the location of the cast affordance 262B. In various implementations, the user input 299X is input by a user clicking a mouse button while a cursor is displayed at the location of the cast affordance 262B.

Figure 2Y:
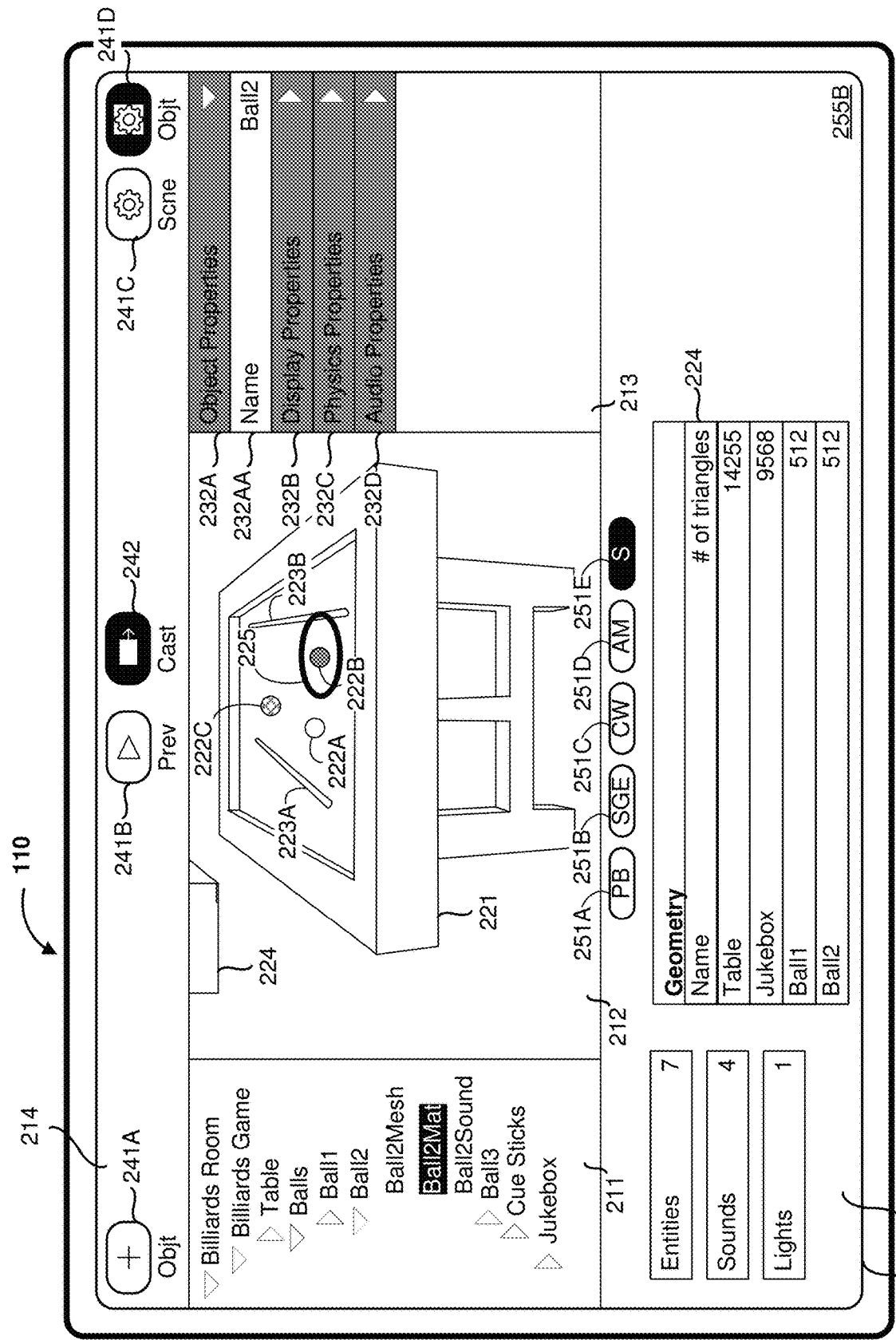

FIG. 2Y illustrates the GUI 201 of FIG. 2X in response to detecting the user input 299X directed to the cast affordance 262B. In response to detecting the user input 299X directed to the cast affordance 262B, the electronic device 110 stores the assets of the XR scene in a container file. Further, the electronic device 110 transmits the container file to the particular electronic device named "HMD001". To indicate that the particular electronic device is receiving the container file, the casting affordance 242 is highlighted.

Figure 2Z:
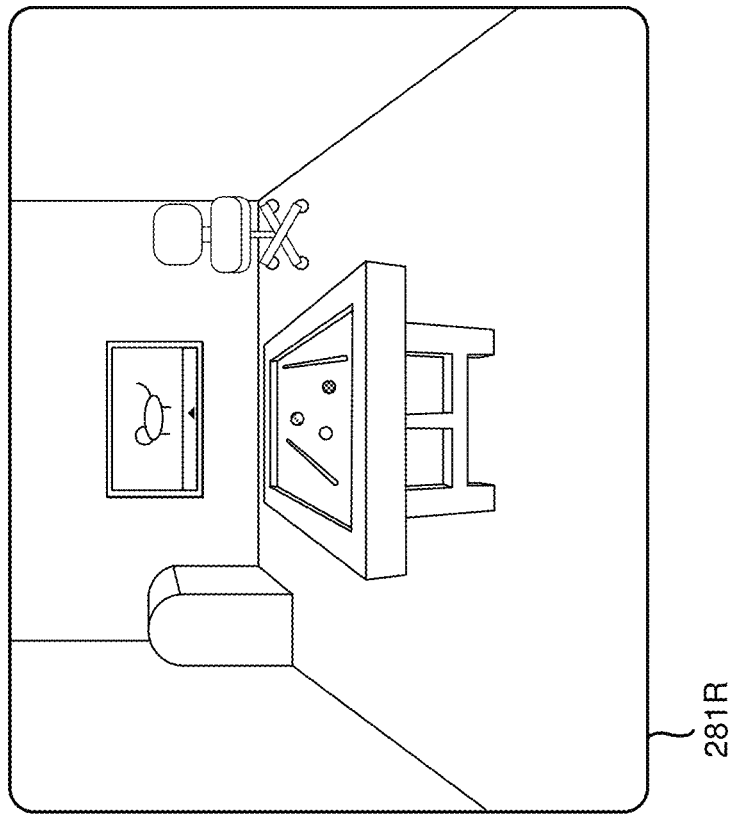
Figure 2Z:
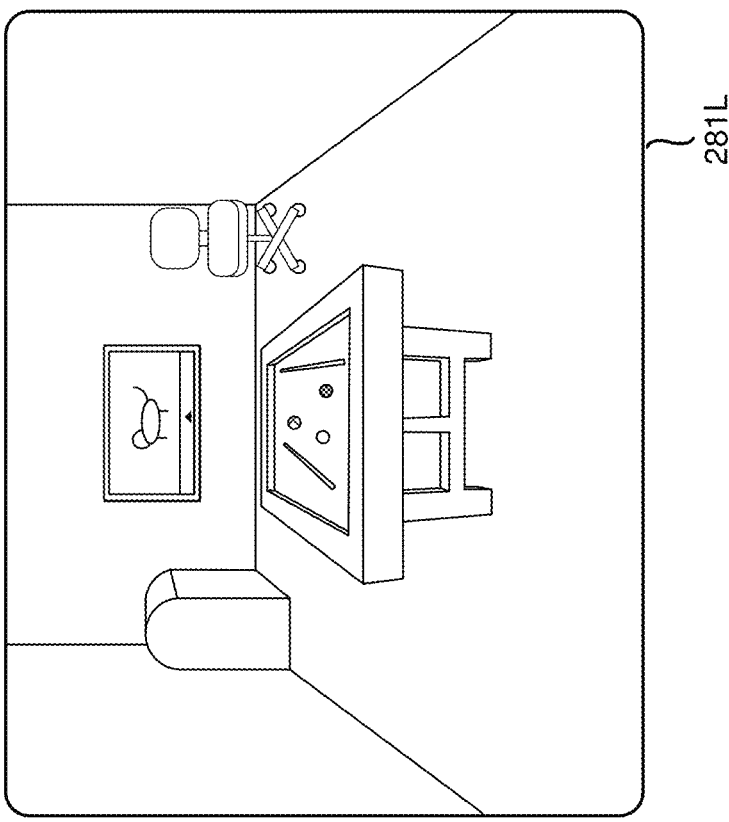

FIG. 2Z illustrates the particular electronic device displaying a stereoscopic preview of the XR scene. The particular electronic device includes a left display 281L displaying a left image of the preview of the XR scene and a right display 281R displaying a right image of the preview of the XR scene. The preview of the XR scene is presented in conjunction with a physical environment (or a representation of a physical environment) including the physical television and the physical chair. For example, in various implementations, the left image of the preview of the XR scene includes a composite image of the XR scene rendered from a left virtual camera perspective and an image of the physical environment captured from a left image sensor perspective. Similarly, the right image of the preview of the XR scene includes a composite image of the XR scene rendered from a right virtual camera perspective and an image of the physical environment captured from a right image sensor perspective. In various implementations, moving the particular electronic device moves the virtual camera perspective (and the image sensor perspective).

In various implementations, the particular electronic device displays the stereoscopic preview of the XR scene in response to receiving the container file from the electronic device 110 without further input from a user on the particular electronic device. To that end, in various implementations, the electronic device 110 transmits, with the container file, a command to display the preview of the stereoscopic preview of the XR scene. In various implementations, in response to the particular electronic device determining that the electronic device 110 has casting privileges, the particular electronic device executes the command.

Figure 3A:
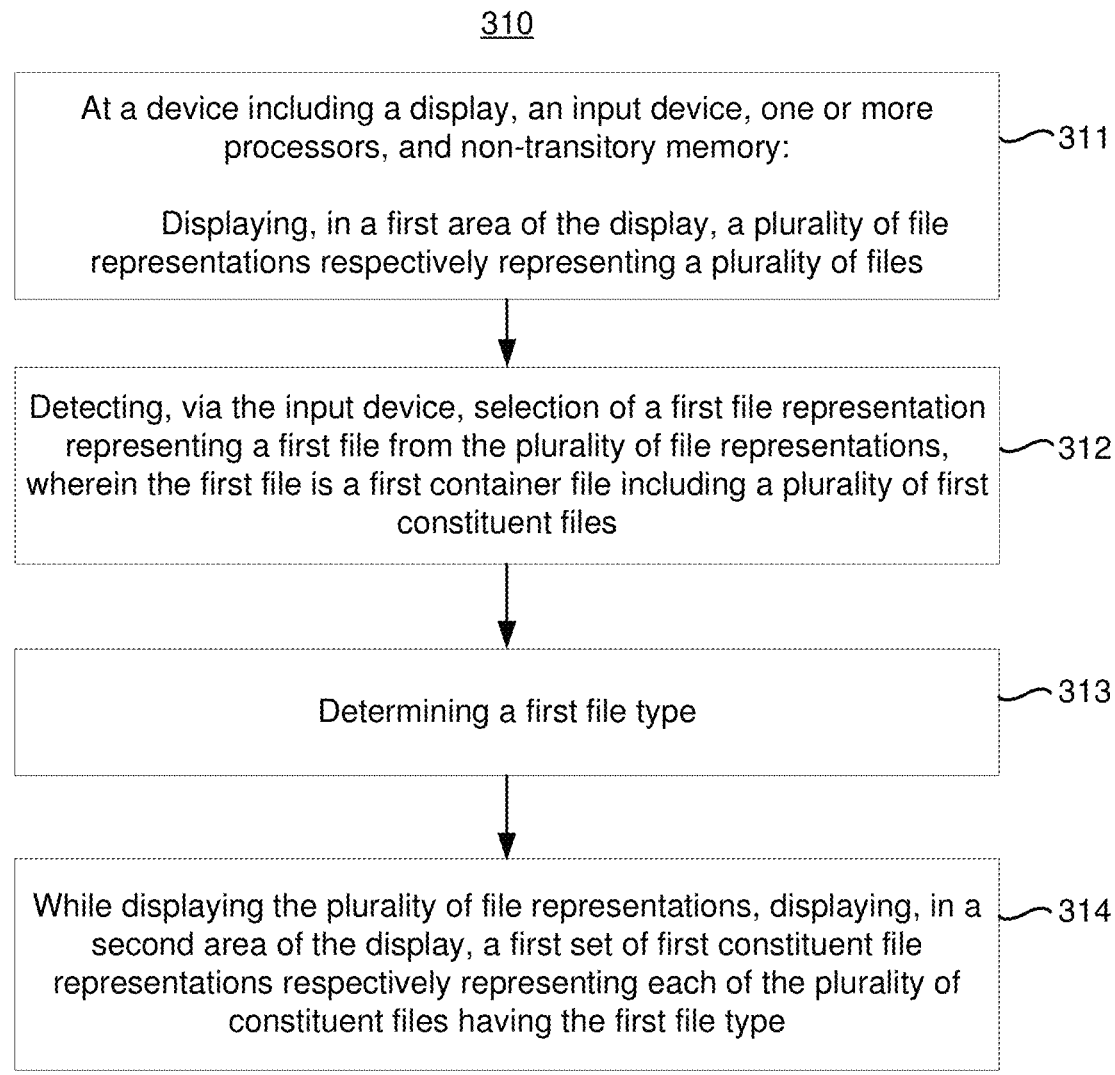
FIG. 3A is a flowchart representation of a method of displaying files in accordance with some implementations.

FIG. 3A is a flowchart representation of a method 310 of displaying files in accordance with some implementations. In various implementations, the method 310 is performed by a device with a display, an input device, one or more processors, and non-transitory memory. In some implementations, the method 310 is performed by processing logic, including hardware, firmware, software, or a combination thereof. In some implementations, the method 310 is performed by a processor executing instructions (e.g., code) stored in a non-transitory computer-readable medium (e.g., a memory).

The method 310 begins, in block 311, with the device displaying, in a first area of the display, a plurality of file representations respectively representing a plurality of files. In various implementations, the plurality of file representations includes one or more icons. For example, in FIG. 2D, the electronic device 110 displays the project browser view region 252B including the first icon representing the virtual billiards game file and the second icon representing the virtual jukebox file.

The method 310 continues, in block 312, with the device detecting, via the input device, selection of a first file representation representing a first file of the plurality of file representations. For example, in FIG. 2D, the electronic device 110 detects the user input 299D selecting the first icon. In various implementations, the first file is a first container file including a plurality of constituent files. For example, in FIG. 2D, the virtual billiards game file is a container file including a plurality of constituent files, including, among others, the virtual table mesh file, the first virtual ball material file, and the second virtual ball sound file.

The method 310 continues, in block 313, with the device determining a first file type. For example, in FIG. 2I, the electronic device 110 determines a mesh file type. The electronic device 110 determines the mesh file type as a default file type prior to selection by a user, e.g., using the type selections affordances 254A-254E, of a different file type. In various implementations, determining the first file type includes detecting selection of a first type affordance associated with the first file type. For example, in FIG. 2I, the electronic device 110 detects the user input 299I selecting the material type affordance 254B and determines, in FIG. 2J, a material file type.

In various implementations, the method 310 includes displaying a plurality of type selection affordances including a first type affordance associated with the first file type. In various implementations, the plurality of type affordances includes one or more of a mesh affordance associated with a mesh file type, a material affordance associated with a material file type, a sound affordance associated with a sound file type, a lighting affordance associated with a lighting file type, and a code affordance associated with a code file type.

In various implementations, the container file is a 3D scene description file. Accordingly, in various implementations, the first file type is a mesh file type, a material file type, sound file type, lighting file type, or code file type. Whereas FIGS. 2A-2T illustrate a user interface for composing an XR scene, the method 310 may also be applied to other user interfaces, such as a file management (or file browser) user interface. For example, in various implementations, the container file is an archive file (e.g., a ZIP file). Accordingly, in various implementations, the first file type is a document file type, a spreadsheet file type, or a slideshow file type. In various implementations, the container file is a multimedia file, such as an audio file, image file, or video file. In various implementations, the first file type is an audio file type, an image file type, a video file type, or a subtitle file type.

The method 310 continues, in block 314, with the device, while displaying the plurality of file representations, displaying, in a second area of the display, a first set of first constituent file representations respectively representing each of the plurality of first constituent files having the first file type. In various implementations, the second area is adjacent to the first area. For example, in FIG. 2I, after determining a mesh file type, the electronic device 110 displays, in the project browser information region 252C, a list of each of the constituent files of the virtual billiards game having a mesh file type. As another example, in FIG. 2J, after determining a material file type, the electronic device 110 displays, in the project browser information region 252C, a list of each of the constituent files of the virtual billiards game having a material file type.

Thus, in various implementations, the method 310 includes the device, after displaying the first subset of the plurality of constituent files, determining a second file type and, while displaying the plurality of file representations, displaying, in the second area of the display, a second set of first constituent file representations respectively representing each of the plurality of constituent files having the second file type. In various implementations, determining the second file type includes detecting selection of a second type affordance associated with the second file type.

In various implementations, one or more of the plurality of first constituent files having the first file type is within a folder of the container file. For example, in FIG. 2I, the first virtual ball mesh file is within a folder included in the virtual billiards game file, namely, the first virtual ball file (which is, itself, within a folder of the virtual balls file). In various implementations, two or more of the plurality of first constituent files having the first file type are within two or more different folders of the container file. For example, in FIG. 2I, the second virtual ball mesh file is within a different folder than the first virtual ball mesh file. In particular, the second virtual ball mesh file is within the second virtual ball file. As another example, in FIG. 2I, the first virtual cue stick mesh file is within a different folder than any of the virtual ball mesh files. In particular, the first virtual cue stick mesh file is within the first virtual cue stick file (which is, itself, within a folder of the virtual cue sticks file different than any of the virtual ball mesh files).

In various implementations, the method 310 includes the device detecting, via the input device, selection of a second file representation representing a second file from the plurality of file representations, wherein the second file is a second container file including a plurality of second constituent files, and, while displaying the plurality of file representations, displaying, in the second area of the display, a first set of second constituent file representations respectively representing each of the plurality of second constituent files having the first file type. For example, in FIG. 2K, after detecting the user input 299J selecting the virtual jukebox file, the electronic device 110 displays, in the project browser information region 252C as list of all the constituent files of the virtual jukebox having the material type which include a single file, the virtual jukebox material file. Thus, in various implementations, the first set of first constituent file representations includes a single first constituent file representation. In various implementations, the first set of first constituent file representations includes a plurality of first constituent file representations.

FIG. 3B is a flowchart representation of a method 320 of casting an scene in accordance with some implementations. In various implementations, the method 320 is performed by a first device with a display, an input device, one or more processors, and non-transitory memory. In some implementations, the method 320 is performed by processing logic, including hardware, firmware, software, or a combination thereof. In some implementations, the method 320 is performed by a processor executing instructions (e.g., code) stored in a non-transitory computer-readable medium (e.g., a memory).

The method 320 begins, in block 321, with the first device displaying, on the display, a graphical user interface for composing an XR scene, wherein the graphical user interface includes an assets region displaying a list of assets of the XR scene and a casting affordance. For example, in FIG. 2V, the electronic device 110 displays the GUI 201 including the assets region 211 and the casting affordance 242. In various implementations, the graphical user interface further includes a view region displaying representations of the assets of the XR scene. For example, in FIG. 2V, the electronic device 110 displays the GUI 201 including the view region 212.

The method 320 continues, in block 322, with the first device detecting, via the input device, a user input selecting the casting affordance. For example, in FIG. 2V, the electronic device 110 detects the user input 299V directed to the casting affordance 242.

The method 320 continues, in block 323, with the first device, in response to detecting the user input selecting the casting affordance, determining a second device to receive a container file, wherein the second device is a stereoscopic device. In various implementations, determining the second device includes determining one or more available devices, wherein the one or more available devices includes one or more stereoscopic devices and the second device is one of the one or more stereoscopic devices. In various implementations, the one or more stereoscopic devices each include two displays (or two display portions) for viewing a stereoscopic image. For example, in various implementations, the one or more stereoscopic devices each display a left image to a left eye of a user and a right image to a right eye of a user. In various implementations, the one or more stereoscopic devices include one or more of augmented reality glasses, an XR headset, a head-mounted display, or a lenticular display.

In various implementations, determining the second device includes displaying a list of the one or more available devices and detecting, via the input device, a user input selecting the second device. For example, in FIG. 2W, the electronic device 110 displays the list of available electronic devices 261 and the user input 299W selecting the particular electronic device named "HMD001". In various implementations, determining the second device includes determining that the second device is the only available device. Thus, in various implementations, if there is only one available device (e.g., the second device), the container file is transmitted to the second device without further user input.

In various implementations, the one or more available devices further includes one or more monoscopic devices.

For example, in various implementations, the one or more monoscopic devices include one or more of a laptop, a smartphone, a tablet, or a television. In various implementations, the one or more available devices include one or more head-mounted devices. For example, the one or more head-mounted devices include one or more of augmented reality glasses, an XR headset, or a head-mounted display. In various implementations, the second device is one of the one or more head-mounted devices. In various implementations, the one or more available devices include one or more handheld devices. For example, in various implementations, the one or more handheld devices include one or more of a smartphone or tablet.

In various implementations, determining whether a device is an available device is based on one or more of a number of factors. In various implementations, determining the one or more available devices includes determining one or more devices paired with the first device. In various implementations, determining the one or more available devices includes determining one or more devices which are powered on and within a transmission range of the first device. In various implementations, determining the one or more available devices includes determining one or more devices which are associated with a user identifier associated with the first device.

In various implementations, determining the one or more available devices includes determining one or more devices for which the first device has casting privileges. In various implementations, the first device is granted casting privileges by the second device prior to detecting the user input selecting the casting affordance. In various implementations, the first device has casting privileges with devices which are associated with a user identifier associated with the first device. Thus, in various implementations, determining one or more devices for which the first device has casting privileges includes determining one or more devices which are associated with a user identifier associated with the first device.

As noted above, in various implementations, determining whether a device is an available device is based on multiple factors. For example, in various implementations, for a device to be determined an available device, the device must be both paired with the first device and powered on and within transmission range of the first device. As another example, in various implementations, for a device to be determined an available device, the device must be both associated with a user identifier associated with the first device and powered on, but is not necessarily paired with the first device.

The method 320 continues, in block 324, with the first device storing the assets of the XR scene as the container file. In various implementations, the container file is a 3D scene description file. Accordingly, in various implementations, the assets of the XR scene stored as the container file include one or more meshes or materials. In various implementations, the assets of the XR scene stored as the container file include one or more sounds or lights. In various implementations, the container file is an archive file (e.g., a ZIP file).

The method 320 continues, in block 325, with the first device transmitting the container file to the second device. In various implementations, the method 320 further includes transmitting a command to open the container file and display a preview of the XR scene. In various implementations, the second device executes the command (and opens the container file and displays the preview of the XR scene) without further user input at the second device. In various implementations, the second device executes the command in response to determining that the first device has casting privileges for the second device. In various implementations, while the second device is displaying the preview of the XR scene, the first device transmits a command to cease display of the preview of the XR scene. In various implementations, the second device executes the command (and ceases display of the preview of the XR scene) without further user input at the second device.

In various implementations, the method 320 includes, detecting, via the input device, a user input changing the XR scene. The method 320 includes, in response to detecting the user input changing the XR scene, storing the assets of the changed XR scene as an updated container file and transmitting the updated container file to the second device. In various implementations, the second device opens the updated container file and displays as preview of the changed XR scene without further user input at the second device.

Figure 4:
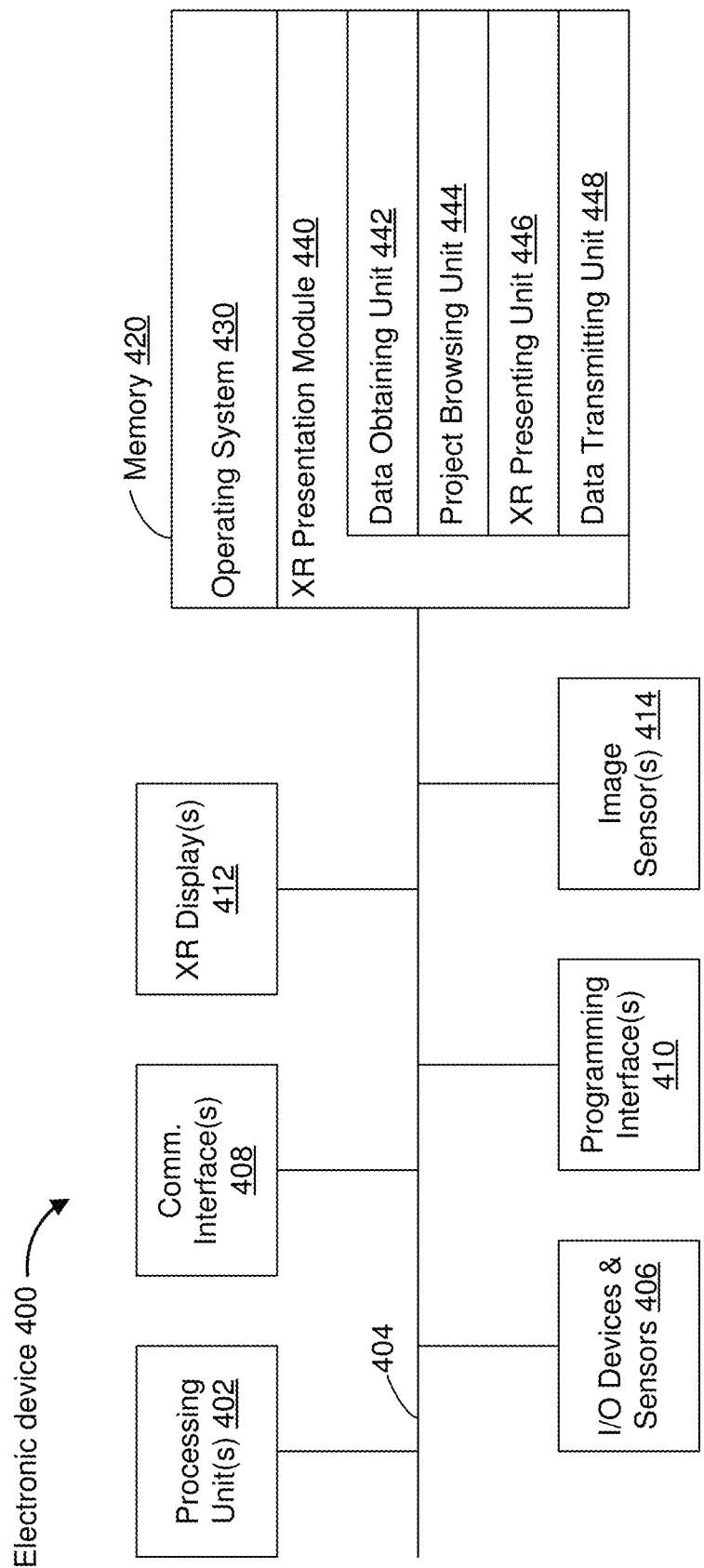
FIG. 4 is a block diagram of an electronic device in accordance with some implementations.

FIG. 4 is a block diagram of an electronic device 400 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 400 includes one or more processing units 402 (e.g., microprocessors, ASICs, FPGAs, GPUs, CPUs, processing cores, and/or the like), one or more input/output (I/O) devices and sensors 406, one or more communication interfaces 408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 410, one or more XR displays 412, one or more optional interior- and/or exterior-facing image sensors 414, a memory 420, and one or more communication buses 404 for interconnecting these and various other components.

In some implementations, the one or more communication buses 404 include circuitry that interconnects and controls communications between system components. In some implementations, the one or more I/O devices and sensors 406 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 412 are configured to present XR content to the user. In some implementations, the one or more XR displays 412 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 412 correspond to diffractive, reflective, polarized, holographic, etc. waveguide displays. For example, the electronic device 400 includes a single XR display. In another example, the electronic device 400 includes an XR display for each eye of the user. In some implementations, the one or more XR displays 412 are capable of presenting AR, MR, and/or VR content.

In various implementations, the one or more XR displays 412 are video passthrough displays which display at least a portion of a real scene as an image captured by a scene camera. In various implementations, the one or more XR displays 412 are optical see-through displays which are at least partially transparent and pass light emitted by or reflected off the real scene.

In some implementations, the one or more image sensors 414 are configured to obtain image data that corresponds to at least a portion of the face of the user that includes the eyes of the user (any may be referred to as an eye-tracking camera). In some implementations, the one or more image sensors 414 are configured to be forward-facing so as to obtain image data that corresponds to the physical environment as would be viewed by the user if the electronic device 400 was not present (and may be referred to as a scene camera). The one or more optional image sensors 414 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof including an optional operating system 430 and an XR presentation module 440.

The operating system 430 includes procedures for handling various basic system services and for performing hardware dependent tasks. In some implementations, the XR presentation module 440 is configured to present XR content to the user via the one or more XR displays 412. To that end, in various implementations, the XR presentation module 440 includes a data obtaining unit 442, a project browsing unit 444, an XR presenting unit 446, and a data transmitting unit 448.

In some implementations, the data obtaining unit 442 is configured to obtain data (e.g., presentation data, interaction data, sensor data, location data, etc.). The data may be obtained from the one or more processing units 402 or another electronic device. To that end, in various implementations, the data obtaining unit 442 includes instructions and/or logic therefor, and heuristics and metadata therefor.

In some implementations, the project browsing unit 444 is configured to provide an interface for viewing assets of an XR scene. To that end, in various implementations, the project browsing unit 444 includes instructions and/or logic therefor, and heuristics and metadata therefor.

In some implementations, the XR presenting unit 446 is configured to present XR content via the one or more XR displays 412. To that end, in various implementations, the XR presenting unit 446 includes instructions and/or logic therefor, and heuristics and metadata therefor.

In some implementations, the data transmitting unit 448 is configured to transmit data (e.g., presentation data, location data, etc.) to the one or more processing units 402, the memory 420, or another electronic device. To that end, in various implementations, the data transmitting unit 448 includes instructions and/or logic therefor, and heuristics and metadata therefor.

Although the data obtaining unit 442, the project browsing unit 444, the XR presenting unit 446, and the data transmitting unit 448 are shown as residing on a single electronic device 400, it should be understood that in other implementations, any combination of the data obtaining unit 442, the project browsing unit 444, the XR presenting unit 446, and the data transmitting unit 448 may be located in separate computing devices.

Moreover, FIG. 4 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a first device including a display, an input device, one or more processors, and non-transitory memory:
   displaying, on the display, a graphical user interface for composing an XR scene, wherein the graphical user interface includes an assets region displaying a list of assets of the XR scene and a casting affordance;
   detecting, via the input device, a user input selecting the casting affordance; and
   in response to detecting the user input selecting the casting affordance:
      determining a second device to receive a container file, wherein the second device is a stereoscopic device;
      storing the assets of the XR scene as the container file; and
      transmitting the container file to the second device.

2. The method of claim 1, wherein determining the second device includes determining one or more available devices, wherein the one or more available devices includes one or more stereoscopic devices and the second device is one of the one or more stereoscopic devices.

3. The method of claim 2, wherein determining the second device includes:
   displaying a list of the one or more available devices; and
   detecting, via the input device, a user input selecting the second device.

4. The method of claim 2, wherein determining the second device includes determining that the second device is the only available device.

5. The method of claim 2, wherein the one or more available devices include one or more head-mounted devices and the second device is one of the one or more head-mounted devices.

6. The method of claim 2, wherein the one or more available devices include one or more handheld devices.

7. The method of claim 2, wherein determining the one or more available devices includes determining one or more devices paired with the first device.

8. The method of claim 2, wherein determining the one or more available devices includes determining one or more devices which are powered on and within a transmission range of the first device.

9. The method of claim 2, wherein determining the one or more available devices includes determining one or more devices which are associated with a user identifier associated with the first device.

10. The method of claim 2, wherein determining the one or more available devices includes determining one or more devices for which the first device has casting privileges.

11. The method of claim 10, wherein the first device is granted casting privileges by the second device prior to detecting the user input selecting the casting affordance.

12. The method of claim 10, wherein the first device has casting privileges with devices which are associated with a user identifier associated with the first device.

13. The method of claim 1, wherein the assets of the XR scene stored as the container file include one or more meshes or materials.

14. The method of claim 1, wherein the assets of the XR scene stored as the container file include one or more sounds or lights.

15. The method of claim 1, wherein transmitting the container file to the second device includes transmitting a command to open the container file and display a preview of the XR scene.

16. The method of claim 15, wherein the second device executes the command without further user input at the second device.

17. The method of claim 16, wherein the second device executes the command in response to determining that the first device has casting privileges for the second device.

18. The method of claim 1, further comprising:
   detecting, via the input device, a user input changing the XR scene;
   in response to detecting the user input changing the XR scene,
      storing the assets of the changed XR scene as an updated container file; and
      transmitting the updated container file to the second device.

19. A first device comprising:
   a display;
   an input device;
   non-transitory memory; and
   one or more processors to:
      display, on the display, a graphical user interface for composing an XR scene, wherein the graphical user interface includes an assets region displaying a list of assets of the XR scene and a casting affordance;
      detect, via the input device, a user input selecting the casting affordance; and
      in response to detecting the user input selecting the casting affordance:
         determine a second device to receive a container file, wherein the second device is a stereoscopic device;
         store the assets of the XR scene as the container file; and
         transmit the container file to the second device.

20. A non-transitory memory having instructions encoded thereon which, when executed by a first device including a display and an input device, cause the device to:
   display, on the display, a graphical user interface for composing an XR scene, wherein the graphical user interface includes an assets region displaying a list of assets of the XR scene and a casting affordance;
   detect, via the input device, a user input selecting the casting affordance; and
   in response to detecting the user input selecting the casting affordance:
      determine a second device to receive a container file, wherein the second device is a stereoscopic device;

store the assets of the XR scene as the container file; and transmit the container file to the second device.

\* \* \* \* \*